(12) United States Patent
Mohassel et al.

(10) Patent No.: US 10,990,617 B2
(45) Date of Patent: *Apr. 27, 2021

(54) METHOD AND SYSTEM FOR SEARCHING ENCRYPTED DATA

(71) Applicant: Oath Inc., New York, NY (US)

(72) Inventors: Payman Mohassel, San Jose, CA (US); Ian Miers, Baltimore, MD (US)

(73) Assignee: Verizon Media Inc., New York, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 16/137,593

(22) Filed: Sep. 21, 2018

(65) Prior Publication Data

US 2019/0026362 A1 Jan. 24, 2019

Related U.S. Application Data

(63) Continuation of application No. 15/586,483, filed on May 4, 2017, now Pat. No. 10,095,776, which is a (Continued)

(51) Int. Cl.
*G06F 21/00* (2013.01)
*G06F 16/31* (2019.01)
(Continued)

(52) U.S. Cl.
CPC ........ *G06F 16/325* (2019.01); *G06F 12/1408* (2013.01); *G06F 16/20* (2019.01);
(Continued)

(58) Field of Classification Search
CPC ...... G06F 16/325; G06F 16/20; G06F 16/338; G06F 16/951; G06F 21/6227; G06F 12/1408; G06F 21/602; G06F 2212/1052
See application file for complete search history.

(56) References Cited

U.S. PATENT DOCUMENTS 7,440,952 B1 * 10/2008 Satoh .................... G06F 16/134
2005/0259547 A1 * 11/2005 Hwang ............ G11B 20/00086
369/53.21

(Continued)

OTHER PUBLICATIONS

Yuan et al., "Building an Encrypted, Distributed, and Searchable Key-value Store", Proceedings of the 11th ACM on Asia Conference on Computer and Communications Security, pp. 547-558, May (Year: 2016).*

(Continued)

*Primary Examiner* — Morshed Mehedi
(74) *Attorney, Agent, or Firm* — Pillsbury Winthrop Shaw Pittman LLP

(57) ABSTRACT

The present teaching relates to searching encrypted data. In one example, a search request is received for encrypted documents. An encrypted query is generated based on the search request. The encrypted query is sent to a server that stores a first encrypted index and a second encrypted index. The first encrypted index maps encrypted keywords to full blocks each of which has a same size and is fully filled with encrypted document identities (IDs). The second encrypted index maps encrypted keywords to partial blocks each of which has the same size and is partially filled with encrypted document IDs. Based on the encrypted query, one or more encrypted document IDs are determined by searching against both the first encrypted index and the second encrypted index. A search result is generated based on the one or more encrypted document IDs. The search result is provided in response to the search request.

20 Claims, 19 Drawing Sheets

Related U.S. Application Data continuation of application No. 15/047,003, filed on Feb. 18, 2016, now Pat. No. 9,715,546.

(51) Int. Cl.

| | |
|---|---|
| *G06F 16/20* | (2019.01) |
| *G06F 16/338* | (2019.01) |
| *G06F 16/951* | (2019.01) |
| *G06F 21/62* | (2013.01) |
| *G06F 12/14* | (2006.01) |
| *G06F 21/60* | (2013.01) |

(52) U.S. Cl.
CPC .......... *G06F 16/338* (2019.01); *G06F 16/951* (2019.01); *G06F 21/602* (2013.01); *G06F 21/6227* (2013.01); *G06F 2212/1052* (2013.01)

(56) References Cited

U.S. PATENT DOCUMENTS

| | | |
|---|---|---|
| 2006/0101285 A1 | 5/2006 | Chen |
| 2009/0138698 A1 | 5/2009 | Chang |
| 2010/0169321 A1* | 7/2010 | Wang .................... G06F 16/316 707/741 |
| 2010/0306221 A1* | 12/2010 | Lokam ..................... H04L 9/32 707/759 |
| 2011/0004607 A1 | 1/2011 | Lokam |
| 2011/0016226 A1 | 1/2011 | Swaminathan |
| 2014/0317081 A1 | 10/2014 | Dubois |
| 2014/0359282 A1* | 12/2014 | Shikfa .................. G06F 21/602 713/165 |
| 2014/0380063 A1* | 12/2014 | Kobayashi .............. G06F 21/10 713/193 |
| 2015/0356314 A1* | 12/2015 | Kumar ................ G06F 16/2228 713/165 |
| 2016/0191544 A1 | 6/2016 | Kim |
| 2016/0330180 A1 | 11/2016 | Egorov |
| 2016/0379009 A1 | 12/2016 | Lee |

OTHER PUBLICATIONS

Office Action dated Oct. 17, 2019 in U.S. Appl. No. 16/115,685.
Notice of Allowance dated Apr. 1, 2020 in U.S. Appl. No. 16/115,685.

* cited by examiner

METHOD AND SYSTEM FOR SEARCHING ENCRYPTED DATA

CROSS REFERENCE TO RELATED APPLICATION

This application is a continuation of U.S. patent application Ser. No. 15/586,483 filed May 4, 2017, which issued as U.S. Pat. No. 10,095,776 on Oct. 9, 2018, which is a continuation of U.S. patent application Ser. No. 15/047,003 filed Feb. 18, 2016, which issued as U.S. Pat. No. 9,715,546 on Jul. 25, 2017, all of which are hereby expressly incorporated by reference in their entireties.

BACKGROUND

1. Technical Field

The present teaching relates to methods, systems, and programming for information retrieval. Particularly, the present teaching is directed to methods, systems, and programming for searching encrypted data.

2. Discussion of Technical Background

Cloud services are effective to seamlessly deploy end-to-end encryption for communications, e.g. with end-to-end encrypted messaging protocols like IMessage or Whatsapp. Video teleconferences can also be secured. Unlike chat and video, email is not ephemeral; but it is archived, stored, and searched for years. End-to-end encryption for email implies that the mail servers will not know the decryption key for decrypting emails. Search is an important feature for email, including encrypted email. As most users typically cannot store years of email on their devices, they opt instead to store their emails in the cloud, which poses a major obstetrical to end-to-end encrypted mail.

Existing solutions for searching encrypted emails include symmetric searchable encryption (SSE) where the server stores an encrypted index for mapping keywords to a list of documents or emails they appear in. But these solutions cannot reach a necessary input/output (IO) efficiency without leaking significantly more information on sent/received emails. To date, all dynamic search schemes store updates to the index in memory due to extremely high IO load. For cloud based systems with hundreds of millions of users each with a distinct index, this is not feasible. Simply storing data in disk is not feasible either, as existing non-encrypted search already reaches an IO bound.

Therefore, there is a need to develop techniques to search for encrypted data to overcome the above drawbacks.

SUMMARY

The present teaching relates to methods, systems, and programming for information retrieval. Particularly, the present teaching is directed to methods, systems, and programming for searching encrypted data.

In one example, a method, implemented on a machine having at least one processor, storage, and a communication platform capable of connecting to a network for searching encrypted data is disclosed. A search request is received for encrypted documents. An encrypted query is generated based on the search request. The encrypted query is sent to a server that stores a first encrypted index and a second encrypted index. The first encrypted index maps encrypted keywords to full blocks each of which has a same size and is fully filled with encrypted document identities (IDs). The second encrypted index maps encrypted keywords to partial blocks each of which has the same size and is partially filled with encrypted document IDs. Based on the encrypted query, one or more encrypted document IDs are determined by searching against both the first encrypted index and the second encrypted index. A search result is generated based on the one or more encrypted document IDs. The search result is provided in response to the search request.

In another example, a method, implemented on a machine having at least one processor, storage, and a communication platform capable of connecting to a network for searching encrypted data is disclosed. An encrypted query is received for encrypted documents. Based on the encrypted query, one or more index locations are determined in a first encrypted index and a second encrypted index. The first encrypted index maps encrypted keywords to full blocks each of which has a same size and is fully filled with encrypted document IDs. The second encrypted index maps encrypted keywords to partial blocks each of which has the same size and is partially filled with encrypted document IDs. One or more encrypted document IDs are identified from the one or more index locations. The one or more encrypted document IDs are provided as a response to the encrypted query.

In yet another example, a system, having at least one processor, storage, and a communication platform connected to a network for searching encrypted data is disclosed. The system comprises: a local index searcher configured for receiving a search request for encrypted documents; a query encryption unit configured for generating an encrypted query based on the search request and for sending the encrypted query to a server that stores a first encrypted index and a second encrypted index, wherein the first encrypted index maps encrypted keywords to full blocks each of which has a same size and is fully filled with encrypted document IDs, and the second encrypted index maps encrypted keywords to partial blocks each of which has the same size and is partially filled with encrypted document IDs; a server-side block reader configured for searching, based on the encrypted query, against both the first encrypted index and the second encrypted index to determine one or more encrypted document IDs; and a search result generator configured for generating a search result based on the one or more encrypted document IDs and providing the search result in response to the search request.

In a different example, a system, having at least one processor, storage, and a communication platform connected to a network for searching encrypted data is disclosed. The system comprises: a search engine configured for receiving an encrypted query for encrypted documents; and an index location determiner configured for determining, based on the encrypted query, one or more index locations in a first encrypted index and a second encrypted index, wherein the first encrypted index maps encrypted keywords to full blocks each of which has a same size and is fully filled with encrypted document IDs, and the second encrypted index maps encrypted keywords to partial blocks each of which has the same size and is partially filled with encrypted document IDs, wherein the search engine is further configured for identifying one or more encrypted document IDs from the one or more index locations and providing the one or more encrypted document IDs as a response to the encrypted query.

Other concepts relate to software for implementing the present teaching on encrypted data searching. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for searching encrypted data with a device is disclosed. The medium, when read by the machine, causes the machine to perform the following: receiving a search request for encrypted documents; generating an encrypted query based on the search request; sending the encrypted query to a server that stores a first encrypted index and a second encrypted index, wherein the first encrypted index maps encrypted keywords to full blocks each of which has a same size and is fully filled with encrypted document IDs, and the second encrypted index maps encrypted keywords to partial blocks each of which has the same size and is partially filled with encrypted document IDs; searching, based on the encrypted query, against both the first encrypted index and the second encrypted index to determine one or more encrypted document IDs; generating a search result based on the one or more encrypted document IDs; and providing the search result in response to the search request.

In another example, a machine-readable, non-transitory and tangible medium having data recorded thereon for searching encrypted data is disclosed. The medium, when read by the machine, causes the machine to perform the following: receiving an encrypted query for encrypted documents; determining, based on the encrypted query, one or more index locations in a first encrypted index and a second encrypted index, wherein the first encrypted index maps encrypted keywords to full blocks each of which has a same size and is fully filled with encrypted document IDs, and the second encrypted index maps encrypted keywords to partial blocks each of which has the same size and is partially filled with encrypted document IDs; identifying one or more encrypted document IDs from the one or more index locations; and providing the one or more encrypted document IDs as a response to the encrypted query.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
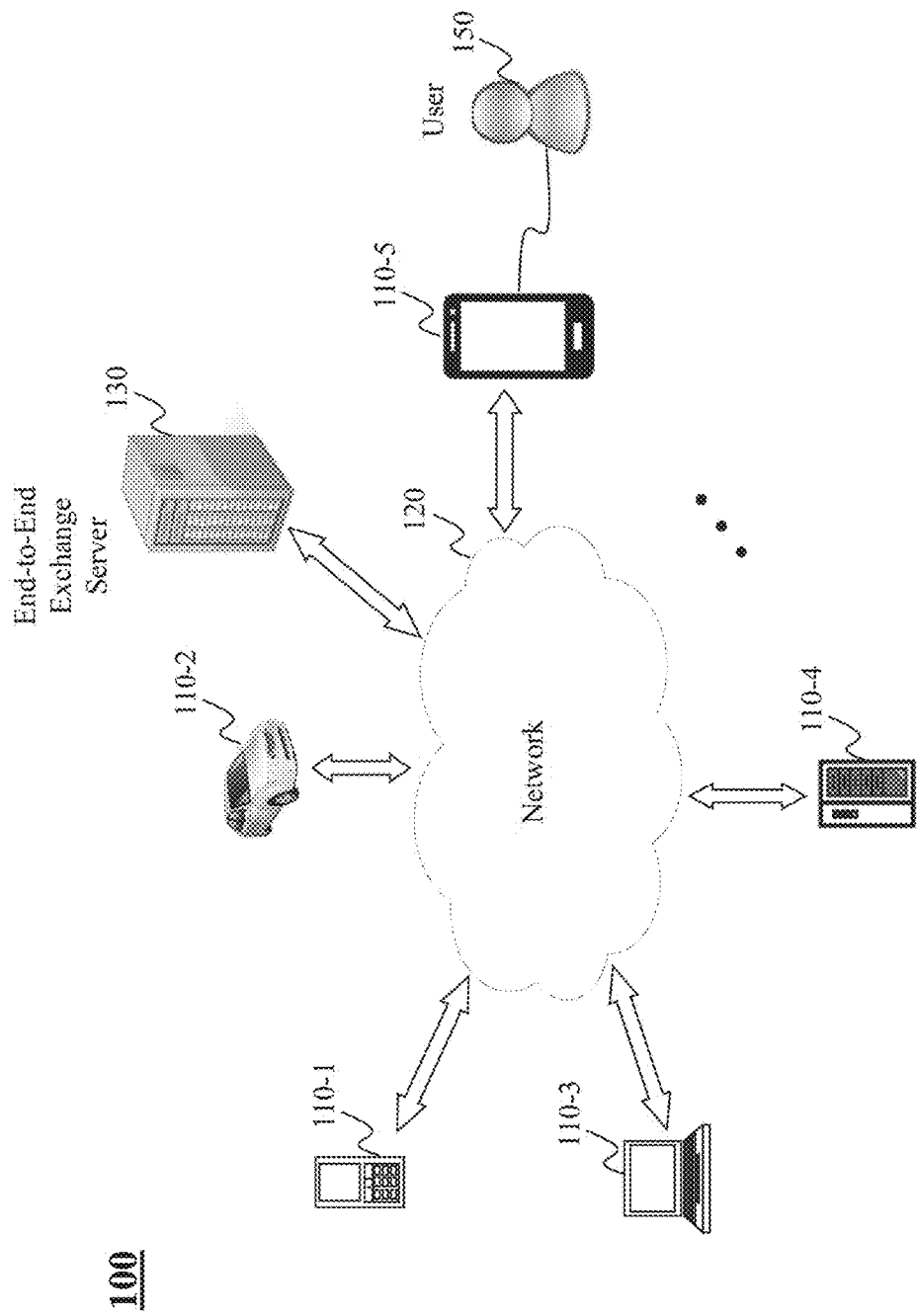
FIG. 1 is a high level depiction of an exemplary networked environment for searching encrypted data, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of searching encrypted data, e.g. end-to-end encrypted emails. The method and system as disclosed herein aim at providing an effective, efficient, and secure solution for searching encrypted data. Search on encrypted email is an important feature for users. The search may be based on a search index that is locally stored on a client device for the past several days. But the client will eventually run out of space, which doesn't allow searching older emails.

Dynamic symmetric searchable encryption (DSSE) may represent a promising solution to this problem, by allowing an untrusted server to maintain an index without leaking mail contents. DSSE schemes can scale to terabytes of data, which far exceeds the few gigs of data used in email. DSSE schemes can even deal with highly dynamic corpuses where many records are added. However, email is a fundamentally different setting for DSSE schemes than typically considered. First, somewhat surprisingly, search is not a very frequently used feature. A large mail provider may see on the order of 10 searches per user per year. Second, unlike other settings, there is little or no initial corpus of data to index; instead all data are added via updates. A typical user receives in on the order of 50 messages a day. Third, each encrypted index is used by one user and must be deployed on cheap commodity hardware. In contrast, many DSSE schemes assume one large dataset being accessed by many users working for a large institution. The combination of these properties, particularly the highly dynamic nature of the index and limited resource budget, renders existing solutions infeasible. To date, all dynamic search schemes store updates to the index in memory due to extremely high IO load. For cloud based systems with hundreds of millions of users each with a distinct index, this is not feasible. Simply storing data in disk is not feasible either, as existing non-encrypted search already reaches an IO bound.

In the present teaching, new solutions are proposed for searching on encrypted data that are suitable for use with end-to-end encrypted emails. In particular, the solutions are geared towards reducing IO efficiency, leaking less information than prior art on updates (sent/received email), and providing low latency for search. To search on encrypted data, a system can store an encrypted search index in a three-level structure: the first level is a non-encrypted hash table on the client, the second level is an encrypted oblivious access data structure on the server, and the third level is a dynamic append-only encrypted hash table on the server.

According to an embodiment of the present teaching, the system can store email IDs in larger blocks for higher IO efficiency. Each block may have a same size, e.g. 50 email IDs in maximum. A block may be a full block that is fully filled with encrypted document IDs, e.g. email IDs. A block may also be a partial block that is partially filled with encrypted document IDs, e.g. email IDs. A partial block may be padded with dummy document IDs to the maximum size. A search index can map keywords to full or partial blocks that contain email IDs. For example, a search index may map a keyword "patent" to a block containing email IDs corresponding to emails including the keyword "patent."

First, the client may maintain a small non-encrypted search index (plus some additional book keeping) for partial blocks. This table can be filled up quickly and is periodically (every day, every 5 days, etc.) pushed to the server. Second, an oblivious data structure, e.g. oblivious Random-Access Memory (ORAM), can be maintained on the server side that stores partial blocks. According to an embodiment of the present teaching, a standard ORAM is modified to make read operations much faster and having low-latency. While the write operations are still expensive, they can be performed in batches and in the background as they do not affect the user experience. Third, a dynamic append-only encrypted search index is maintained on the server side for full blocks. This three-level data-structure provides very fast read/write operations. To search a keyword, one can search all three levels, with an extremely high IO efficiency.

When a new email is sent or received, the client side search index can be updated immediately. Periodically, the client index may be pushed to the ORAM on the server side. When blocks are full, they are encrypted and pushed to the append-only search index on the server side. For some infrequent keyword, it may take a long time to fill a block corresponding to the keyword. To save space, a partial block corresponding to the keyword at the server may be read by the client and updated with the infrequent keyword, instead of generating a new partial block for the keyword, when a new email including the keyword is sent or received.

The present teaching modifies traditional ORAM scheme in several ways, for reading and writing partial blocks at the server. In a standard ORAM scheme, when the system reads a partial block in the ORAM, it reads a whole path including the partial block, from a root to a leaf in a tree data structure. After each reading, the system in a standard ORAM scheme updates position of the partial block to a random value in the path, i.e. shuffling the blocks inside the path. To omit the complicated process in a standard ORAM, the system in the present teaching can directly access a single block in the path, e.g. by storing, for each keyword, addition al information to locate the block. In addition, the system in the present teaching need not do the shuffling on every read as in a standard ORAM. The system in the present teaching can defer the shuffling included by a read to the beginning of an update, called "deferred reads." This can enable considerable savings. First, since updates can be batched (i.e. the system can collect a bunch of updates to various entries locally and only commit them to the server later), the system can shift the computational and bandwidth load to idle time (e.g. when a mobile device is plugged in and connected to Wi-Fi) at the cost of temporary client storage. Second, repeated searches for the same term result in just one deferred read. Third, searches for terms that are mapped to a same leaf also result in just one shuffle operation. Finally, because paths overlap even for distinct leaves, the system can realize considerable savings. For example, for 10 deferred read shuffles, the system can end up transmitting the root of the tree twice instead of 20 times, the children of root twice instead of 5 times, etc. As such, the present teaching would enable search on encrypted data, e.g. emails in end-to-end solutions with higher IO efficiency, lower search latency and better security than prior art.

The terms "user" and "client" may be used interchangeably herein. The terms "chunk" and "block" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for searching encrypted data, according to an embodiment of the present teaching. In FIG. 1, the exemplary networked environment 100 includes one or more client devices 110-1, 110-2, 110-3, 110-4, 110-5, a network 120, an end-to-end exchange server 130, and a user 150. The network 120 may be a trust network where the client devices can communicate to each other securely, e.g. by encrypted emails, encrypted messages, etc., with or without the end-to-end exchange server 130. The network 120 may be in form of a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof.

The client devices may be of different types such as desktop computers 110-4, laptop computers 110-3, a built-in device in a motor vehicle 110-2, a mobile device 110-1, or a smartphone 110-5. A client device may be connected to the network 120 and able to communicate with another client device via the end-to-end exchange server 130. This kind of end-to-end communication can be secure with a long term secret key shared by all the client devices connected to the network 120.

The end-to-end exchange server 130 may be a server that can help exchanging data or messages between any two client devices. The end-to-end exchange server 130 may be provided by an online service provider or content provider owned by an entity, whether an individual, a firm, or an organization. Examples of content providers include, but are not limited to, online news providers (e.g., The New York Times, The Wall Street Journal, Reuters, CNN, etc.), blogs (Tumblr, The Huffington Post, The Daily Beast, The Daily Caller, Tech Crunch, etc.), online game providers (e.g., Gaikai, OnLive, Playcast Media Systems, Zynga, etc.), massive online open courses (or MOOCs, e.g., Coursera, SlideRule, Khan Academy, Udemy, etc.), entertainment websites (e.g., ESPN, Hulu, Netflix, etc.), online database providers (e.g., IMDb, Wikipedia, etc.), content aggregators (e. g, Drudge Report, Squidoo, Slashdot, eHow, etc.), web portals (e.g., Yahoo!, Aol, Rediff, MSN, etc.), media hosting services (e.g., Youtube, Vimeo, GoFish, Veoh, etc.) and so forth.

The user 150 may use the client device 110-5 to perform end-to-end communications, e.g. sending or receiving end-to-end encrypted emails, with another user. From time to time, the user 150 may want to search for emails of his/her account. Due to limited storage, the user 150 cannot store all historical emails on the device 110-5, and may thus store most of his/her old emails at the end-to-end exchange server 130. In this case, the search will be performed against a local search index at the device 110-5 and one or more search indices at the end-to-end exchange server 130. Based on a modified ORAM scheme and a three-level data structure of search indices, the search may be performed in an efficient manner without leaking information to the end-to-end exchange server 130.

Figure 2:
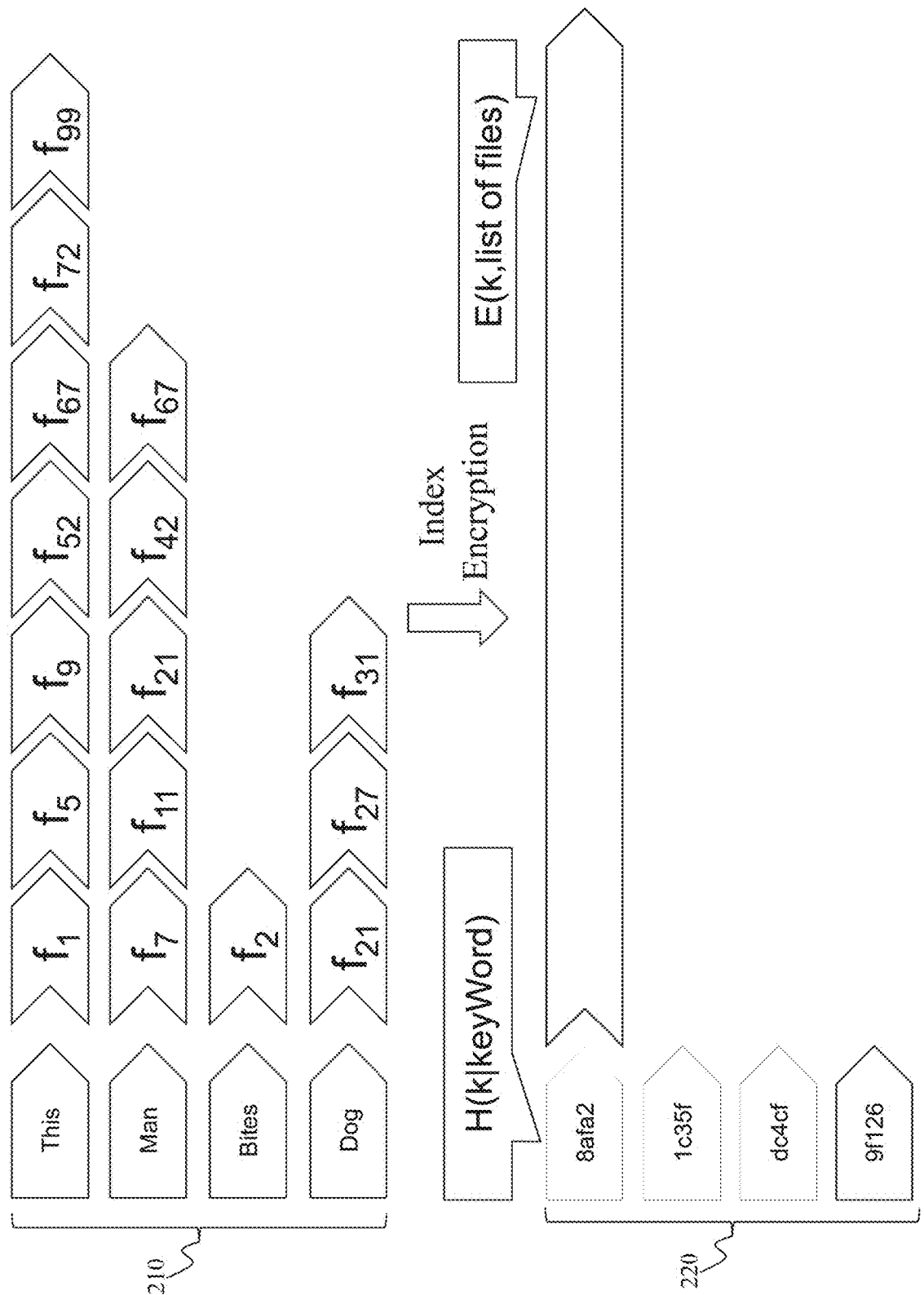
FIG. 2 illustrates an example of a naive encrypted index, according to an embodiment of the present teaching.

FIG. 2 illustrates an example of a naive encrypted index, according to an embodiment of the present teaching. As shown in FIG. 2, a search index 210 is encrypted to an encrypted index 220. An index may be a dictionary mapping keywords to a list of documents they appear in, referred by dict [keyword]→list[document IDs]. A simple way of "encrypting" this index may be to "deterministically" encrypt the keywords and (randomly) encrypt the documents using a secret key k, referred by:

dict [sha256(k∥keyword)]→AES(k',random_iv, list[document IDs]).

Search may then be performed in an obvious way by giving the server the hashed keyword and hides what is searched for. But this solution will leak search token frequency to the server. A server can know how frequency a keyword appears in the emails, and may guess the keyword based on the frequency.

To prevent the index from leaking search token frequency, one approach is to store each document in a different location by including in token a counter incremented after each document is written to the index, referred by dict [sha256(keyword∥per_keyword_document_ctr)]→AES(k',random_iv, document_ID).

But this is very inefficient to search, requires one random read per result, and increases in IO usage.

Figure 3:
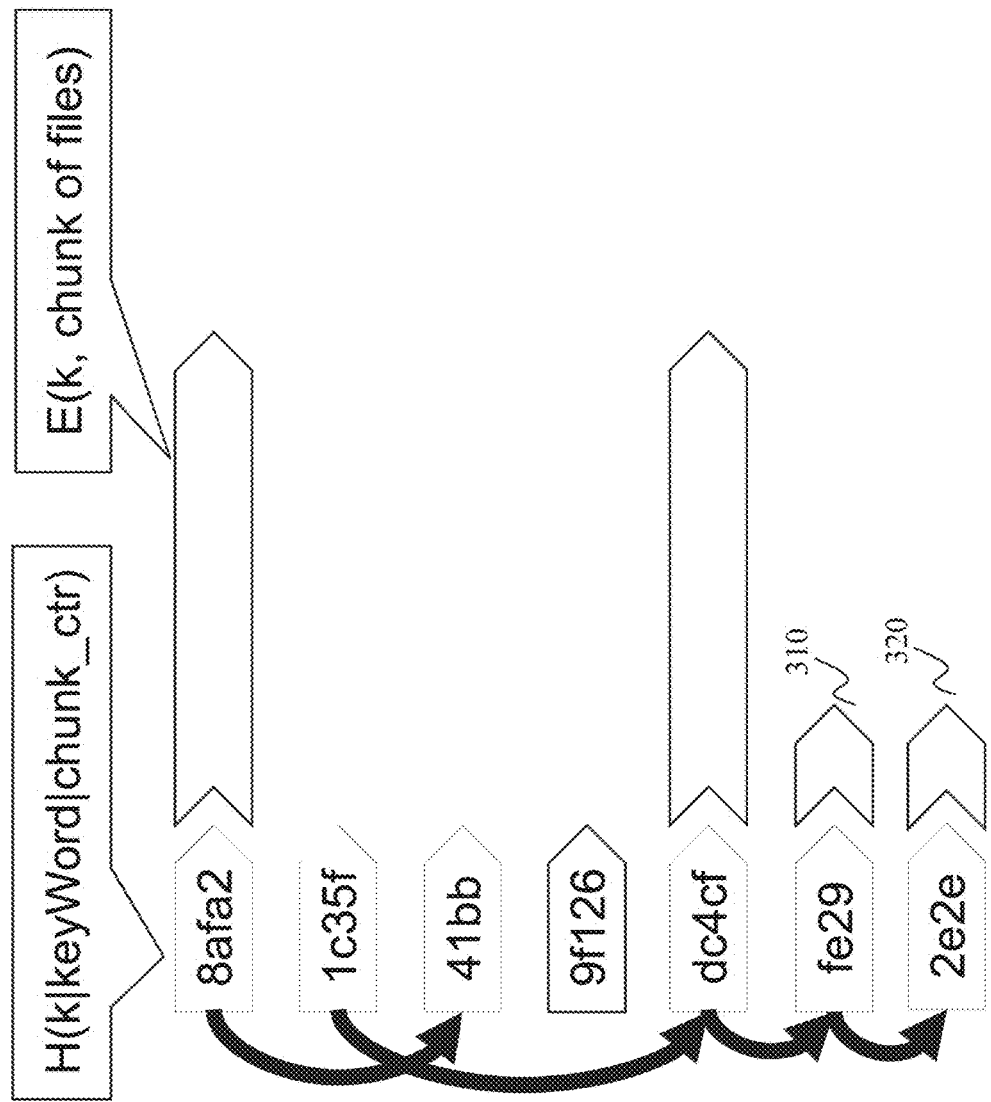
FIG. 3 illustrates an example of a chunked encrypted index, according to an embodiment of the present teaching.

Another method to prevent the index from leaking search token frequency is to break up the list into chunks. FIG. 3 illustrates an example of a chunked encrypted index, according to an embodiment of the present teaching. This method may be less space efficient, because partial chunks 310, 320 need to be padded. But this method is way more efficient for searching. In general, IO efficiency may be more important than storage efficiency. To update the index in FIG. 3, however, may cause inefficiency or information leaking.

For example, after a user receives an email, the system needs to update the index with keywords in the email. For an infrequent keyword that does not appear often in emails, a block or chunk corresponding to the keyword may not be full for a long time, e.g. three months, or forever. After the client device cannot store many half-empty blocks or partial blocks for a long time, it has to push them to the search index at the server before they get full. As time goes by, there will be more and more partial blocks, if they are not re-filled to be full.

Figure 4:
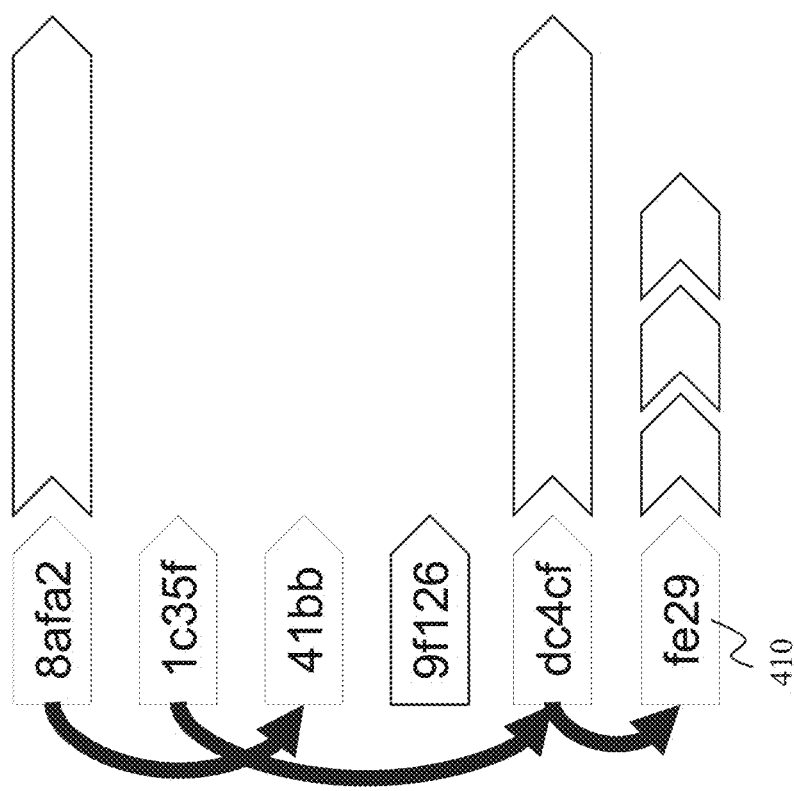
FIG. 4 illustrates another example of a chunked encrypted index, according to an embodiment of the present teaching.

FIG. 4 illustrates another example of a chunked encrypted index, where partial chunks at the server can be filled up, according to an embodiment of the present teaching. For example, after an infrequent keyword "fe29" 410 came in a new email, the client device can read back the partial block corresponding to the keyword from the server. But in this case, the client device leaks to the server that this new email has the same keyword "fe29" 410 as all the previous emails associated with the partial block. This may be worse when there are lots of updates in the search index.

Figure 5:
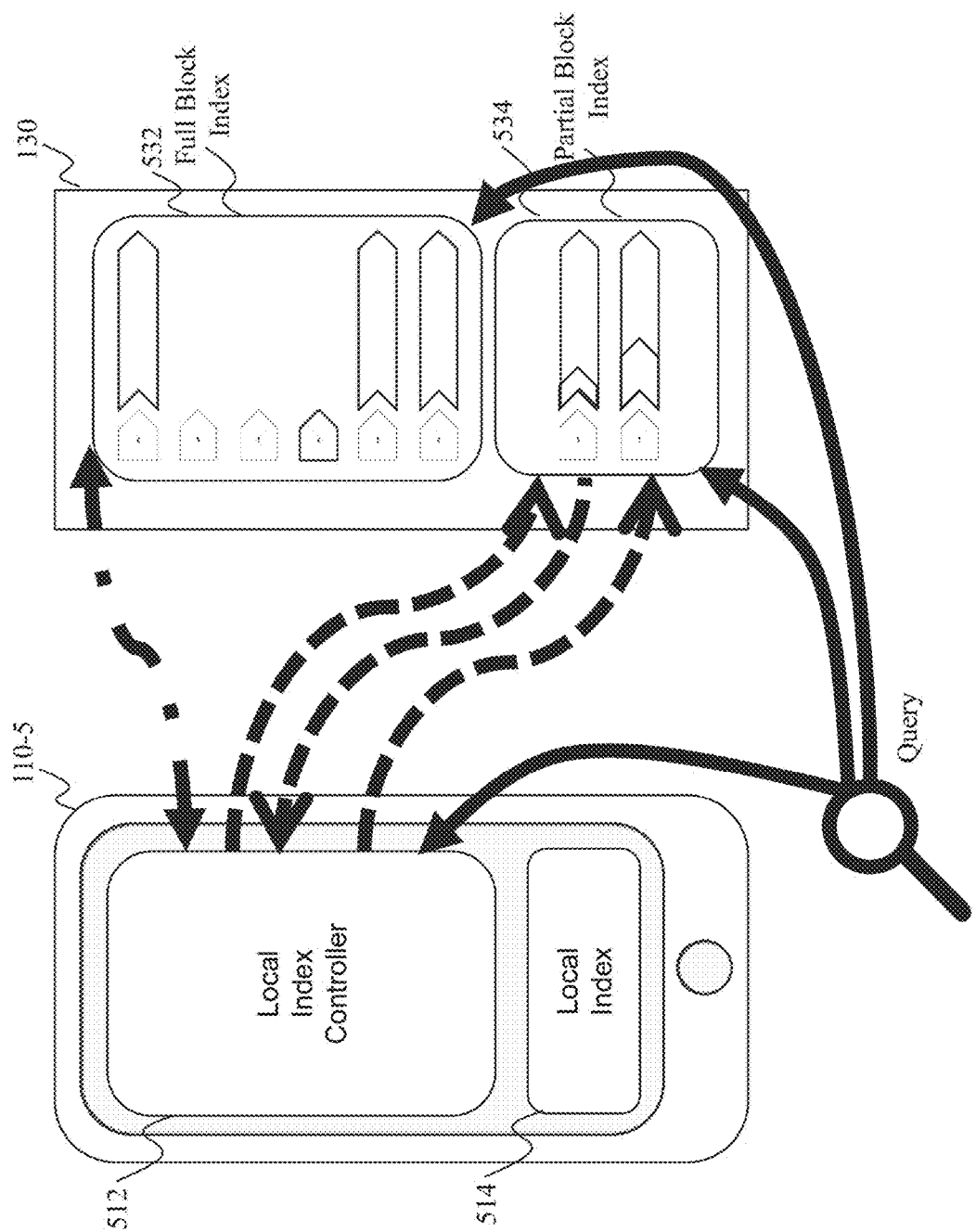
FIG. 5 illustrates examples of updating search index for encrypted data and searching for encrypted data with a query, according to an embodiment of the present teaching.

FIG. 5 illustrates examples of updating search index for encrypted data and searching for encrypted data with a query, according to an embodiment of the present teaching. In this example, the goal is to fill up partial blocks at the server, without leaking to the server that which old block is associated with which email. As shown in FIG. 5, the server 130 in this example includes both a full block index 532 and a separate partial block index 534. In practice, the full block index 532 may be built on an append-only hash table, while the partial block index 534 may be built upon an ORAM.

A hash table is a data structure commonly used for mapping keys to values. It often uses a hash function h that maps a key to an index (or a set of indices) in a memory array M where the value associated with the key may be found. The keyword is not in the table if it is not in one of those locations. More formally, one can define a hash table H=(hsetup; hlookup; hwrite) using a tuple of algorithms. In this example, the full block index 532 may be an append-only hash table index that holds a mapping from an encrypted keyword to a fixed size block containing document IDs. New entries can be added to this index only when the block is full.

ORAM can be thought of as a compiler that encodes the memory into a special format such that accesses on the compiled memory do not reveal the underlying access patterns on the original memory. Path ORAM is a seminal ORAM construction with high practical efficiency. The present teaching can make use of path ORAM as a component. In a non-recursive version of path ORAM, the client stores the position map locally and hence only a single binary tree T is needed to store the data on the server.

Let M be a memory array of size at most $N=2^L$ that one wants to obliviously store on the server. M[i] denotes the i-th block in M. Let T denote a binary tree of depth L, on the server side that will be used to store M. The client stores a position map position where x=position[i] is the index of a uniformly random leaf in T. The invariant path ORAM maintains is that, M[i] is stored in a node on the path from the root to leaf x which is denoted by P(x). P(x; l) denotes the node at level l on path P(x), i.e. the node that has distance l from the root. There is a bucket associated switch each node of the tree T, and each bucket can at most fit Z memory blocks. The client holds a small local stash denoted by S, which contains a set of blocks that need to be pushed into the server's tree. One can assume that memory array M is initially empty. Client's stash S is empty. All the buckets in the tree T are filled with encryptions of dummy data. The position map position is initialized with uniformly random values in $\{0 \ldots 2^L\}$. This encrypted tree is denoted by EM.

For a standard ORAM, to read M[y] or to write a value v at M[y], the client first looks up the leaf position x from the position map, and reads all the buckets along the path P(x). It then updates position[y] to a fresh random value in (0, ldots, $2^L$). If it is a read operation, the encryption of (y; v) will be found in one of the buckets on P(x), which the client decrypts to output v. It also adds all the buckets on P(x) to its local stash. If it is a write operation, the client also adds (y; v) to its local stash. Client encrypts all the blocks in the stash, and inserts as many as possible into the buckets along P(x), inserting each block into the lowest bucket in the path passible while maintaining the invariant that each block y' remains on the path P(position[y']). The read/write operations in a standard ORAM is described in the following protocol in more detail.

---

OBLIVIOUSACCESS($\sigma$, y, v), EM):

1: x ← position [y]

2: position[y] $\xleftarrow{R}$ $\{0, \ldots, 2^L\}$

3: for $\ell \in \{0, \ldots, L\}$ do

4:    S ← S ∪ READBUCKET(P(x, $\ell$))

5: end for
6: data ← Read block y from S
7: if v ≠ then
8:    S ← (S − {(y, data)}) ∪ {(y, v)}
9: end if 10: for $\ell \in \{L, \ldots, 0\}$ do 11:    S' ← {(y', data') ∈ S : P(x, $\ell$) = P(position[y'], $\ell$)}
12:    S' ← Select min(|S'|, Z) blocks from S'.
13:    S ← S − S'
14:    WRITEBUCKET(P(x, $\ell$), S')
15: end for

---

In this example, the partial block index 534 may be a dynamic encrypted index that stores mappings from keywords to fixed sized blocks of documents. However, theses blocks need not be full and are instead padded to the same fixed size. When the block is full of real data (i.e. not padding), its contents are transferred to the full block index 532, an append-only index. This allows messages to be added and deleted from the dynamic index by updating the requisite block. To do so in a way that does not leak which blocks are being updated, the partial block index 534 is built based on an ORAM.

Storing blocks in ORAM allows updating them privately. However, as a generic approach, ORAM is overkill. An index built on-top of ORAM would hide not only writes to the index, but also reads resulting from repeated searches. Not just is this stronger than the typical protections given by searchable encryption (which allowably leak the "search pattern"), in this example this information is already revealed via searches against the append-only index. As a concrete starting point, consider a basic construction of path ORAM. In path ORAM, entries (in this case blocks) are stored as leaves in a full binary tree. Each time an entry is read or written, it is remapped to a random leaf in the tree or, if that position is full, the first empty slot in the path from that leaf to the tree root. A read or write entails reading everything on the path from leaf to root. Then mapping the read/written entry onto a random leaf and storing it locally in the stash. Finally, the entries read from the path and anything in the stash which mapped to somewhere on that path, is written back. In other words, in path ORAM (and ORAM in general), entries are shuffled both on in the case of a read and in the case of write.

The present teaching modifies a standard ORAM as the following. First, in the case of a read (e.g. an index lookup for search), the system in the present teaching can simply omit the complicated machinery for a read, and directly access single entry in the tree. While the position map only stores what leaf an entry was mapped to, not the particular point along the path from leaf to root where it is stored, this can be fixed by storing, for each keyword, additional information to locate the entry. Another issue is that the reshuffling that occurs on a read provides privacy protections not just for the read, but for subsequent writes. If reads are not shuffled, then an observer can identify when frequently read entries are updated. As a result, the system cannot simply have "half" ORAM: to get completely oblivious writes, a client must at some point reshuffle the locations the client read from.

In the dynamic index of the present teaching, i.e. the partial block index 534, the system needs not do the shuffling on every read (as in standard ORAM). Rather, the system can defer the shuffling included by a read to the beginning of an update, called "deferred reads." This enables considerable savings. First, since updates can be batched (i.e. the system can collect a bunch of updates to various entries locally and only commit them to the server later), the system can shift the computational and bandwidth load to idle time (e.g. when a mobile device is plugged in and connected to Wi-Fi) at the cost of temporary client storage. Second, repeated searches for the same term result in just one deferred read. Third, searches for terms that are mapped to a same leaf also result in just one shuffle operation. Finally, because paths overlap even for distinct leaves, the system can realize considerable savings. For example, for 10 deferred read shuffles, the system can end up transmitting the root of the tree twice instead of 20 times, the children of root twice instead of 5 times, etc.

The client device 110-5 in this example includes a local index 514 and a local index controller 512 configured for controlling the local index 514 and communicating with the end-to-end exchange server 130. Protocols for setup, search, and update for the DSSE scheme in the present teaching are described in detail below.

Let H=(hsetup; hlookup; hwrite) be a hash table implementation, E=(KG, Enc, Dec) be a CPA-secure encryption scheme and F:K*M→C be a pseudorandom function. Let W be the universe of all keywords, and L=log(|W|). For simplicity, it is assumed that the DB (a database that is a set of document/keyword-set pair DB=$(d_i, W_i)_{i=1}^N$) is initially empty, and documents are dynamically added. If not, one can run the SSEADD protocol to be described shortly, multiple times to populate the client and server storages with the documents in DB. Client generates three random keys $k_f$, $k_e$, and $k_a$, one for a Pseudorandom Function F, and the other two for the CPA-secure encryption scheme. Client and server initialize the non-recursive path ORAM for a memory of size |W|. The tree stored at the server is denoted by T, and the corresponding stash stored at the client is denoted by S. The server may also set up an initially empty append-only hash table that will be used to store full blocks of document IDs.

For every w ∈ W, the client stores in a local hash table, the key-value pair (w, [$pos_w, l_w, count_w, r_w, B_w$]), where $B_w$ is a block storing IDs of documents containing w (initially empty), posw stores the leaf position in $\{0 \ldots 2^L\}$ corresponding to w (chosen uniformly at random), $l_w$ stores the level of the node on path $P(pos_w)$ that would store the block for documents containing w (initially empty), $count_w$ stores the number of full blocks for keyword w already stored in the append-only hash table (initially 0), and $r_w$ is a bit indicating whether keyword w is searched since last push of client's block to path ORAM (initially 0).

Client's state σ will be the hash table $M_c$, the stash S for the path ORAM and the keys $k_f$, $k_e$, and $k_a$. A detailed description for the setup protocol in the DSSE scheme according to one embodiment of the present teaching is shown below.

---

⟨σ, EDB⟩ ↔ SSESETUP⟨($1^λ$, ⊥), ⊥⟩:

1: Client runs ($h_c, M_c$) ← hsetup( ) to setup a local hash table.
2: Server runs ($h_s, M_s$) ← hsetup( ) to set up an append-only hash table.
3: for w ∈ |W| do
4:  $pos_w \xleftarrow{R} \{0, \ldots, 2^L\}$
5:  $count_w, r_w, \ell_w, \leftarrow 0, B_w \leftarrow \emptyset$
6:  Client runs $M_c \leftarrow$ hwrite(w, [$pos_w, \ell_w, count_w, r_w, B_w$], $M_c$)
7: end for
8: $k_f \leftarrow K(1^λ)$, $k_e \leftarrow KG(1^λ)$, $k_a \leftarrow KG(1^λ)$
9: Client and server run the setup for a non-recursive ORAM. Server stores the tree T, and client sotres the stash S.
10: Client outputs σ = ($M_c, S, k_f, k_a, k_e$)
11: Server outputs EDB = ($M_s, T$)

---

For search, the client will store the matching documents in the initially empty set R=∅. To search locally, the client first looks up w in its local hash table, i.e. the local index 514 to obtain [$pos_w, l_w, count_w, r_w, B_w$], and lets R=R ∪ $B_w$. It then asks the server for the bucket in the tree T at node level $l_w$ and on path $P(pos_w)$, i.e. $P(pos_w, l_w)$. It decrypts the blocks in the bucket using $k_e$. If it finds a tuple (w, $O_w$) in the bucket, it lets R=R ∪ $O_w$. If $r_w$ is not yet set, client lets $r_w$=1 to indicate that w was searched for. For i=1, . . . , $count_w$, client sends $F_{k_f}(w||i)$ to the server, who looks its up in the append-only hash table and returns the encrypted full block $A_w^i$. Client decrypts using $k_a$ and lets R=R ∪ $A_w^i$. Client then outputs R. A detailed description for the search protocol in the DSSE scheme according to one embodiment of the present teaching is shown below.

---

SSESEARCH((σ,w),EDB = (T,$M_s$)):

1:  R ← ∅
2:  [$pos_w, l_w, count_w, r_w, B_w$] ← hlookup(w,$M_c$)
3:  R ← R ∪ $B_w$
4:  U ← READBUCKET(P($pos_w, l_w$))
5:  Read (w, $O_w$) from U
6:  R ← R ∪ $O_w$
7:  $r_w$ ← 1
8:  hwrite(w, [$pos_w, l_w, count_w, r_w, B_w$], $M_c$)
9:  for i ∈ {1,...,$count_w$} do
10:   Client sends $F_{k_f}(w||i)$ to server
11:   Server returns $C_w^i$ ← hlookup($F_{k_f}(w||i), M_s$)
12:   $A_w^i \leftarrow Dec_{k_a}(C_w^i)$
13:   R ← R ∪ $A_w^i$
14: end for
15: Client outputs R

---

Let $id_d$ be the document identifier associated with d. For every keyword w in d, client looks up w in its local hash and adds $id_d$ to $B_w$. It then checks whether its local storage has reached the maximum limit $max_c$ or not. If not, the update is done. Else, the client needs to push all the document blocks to the server. But before doing so, the client needs to finish the ORAM access for all reads done since the last push. In particular, for all non-zero $r_w$'s, client needs to read the whole path $P(pos_w)$, re-encrypt all the buckets using fresh randomness, update posw to a fresh random leaf, and write the buckets back to the tree using the path ORAM approach. Then, for every non-empty block $B_w$ in its local hash, the client performs a full ORAM write to add the documents in $B_w$ to the ORAM block $O_w$ for the same keyword. If $O_w$ becomes full as a result, $max_b$ documents IDs in the block are removed and inserted into $A_w^{count_w+1}$, and inserted to the append-only hash table using a keyword $F_{k_f}(w||count_w+1)$. A detailed description for the update protocol in the DSSE scheme according to one embodiment of the present teaching is shown below.

---

SSEADD((σ, $id_d$), EDB):

1: for w ∈ d do
2:  [$pos_w, \ell_w, count_w, r_w, B_w$] ← hlookup(w, $M_c$)
3:  $B_w \leftarrow B_w \cup \{id_d\}$
4:  hwrite(w, [$pos_w, \ell_w, count_w, r_w, B_w$], $M_c$)
5:  $size_a \leftarrow size_a + 1$
6: end for
7: if $size_e < max_e$ then
8:  return
9: else
10:  U ← {w ∈|W| : $r_w$ == 1}
11:  for w ∈ U do
12:   [$pos_w, \ell_w, count_w, r_w, B_w$] ← hlookup(w, $M_c$)
13:   for $\ell \in \{0, \ldots, L\}$ do
14:    S ← S ∪ READBUCKET(P($pos_w, \ell$))
15:   end for
16:  end for
17:  for (w, $O_w$) ∈ S do
18:   $O_w' \leftarrow O_w \cup B_w$
19:   if $|O_w'| > max_b$ then -continued SSEADD($\sigma$, $id_d$), EDB):

```
20:         count_w ← count_w + 1
21:         O_w" ← first max_b items in O_w'
22:         hwrite(F_{k_f}(w||count_w), O_w", M_s)
23:         O_w' ← O_w" - O_w'
24:      end if
25:      S ← (S - {(w, O_w)}) ∪ {(w, O_w')}
26:   end for 27:   for ℓ ∈ {L, ..., 0} do 28:      S' ← {(w', O_{w'}) ∈ S : P(x, ℓ) = P(pos_{w'}, ℓ)}

29:      S' ← Select min(|S'|, Z) blocks from S'.
30:      S ← S - S'

31:      WRITEBUCKET(P(x, ℓ), S')

32:      for (w, O_w) ∈ S' do

33:         ℓ_w ← ℓ

34:         r_w ← 0
35:         B_w ← ∅

36:         pos_w ←^R {0, ..., 2^L}

37:         hwrite(w, [pos_w, ℓ_w, count_w, r_w, B_w], M_c)

38:      end for
39:   end for
40:   size_z ← 0
41: end if
```

Figure 6:
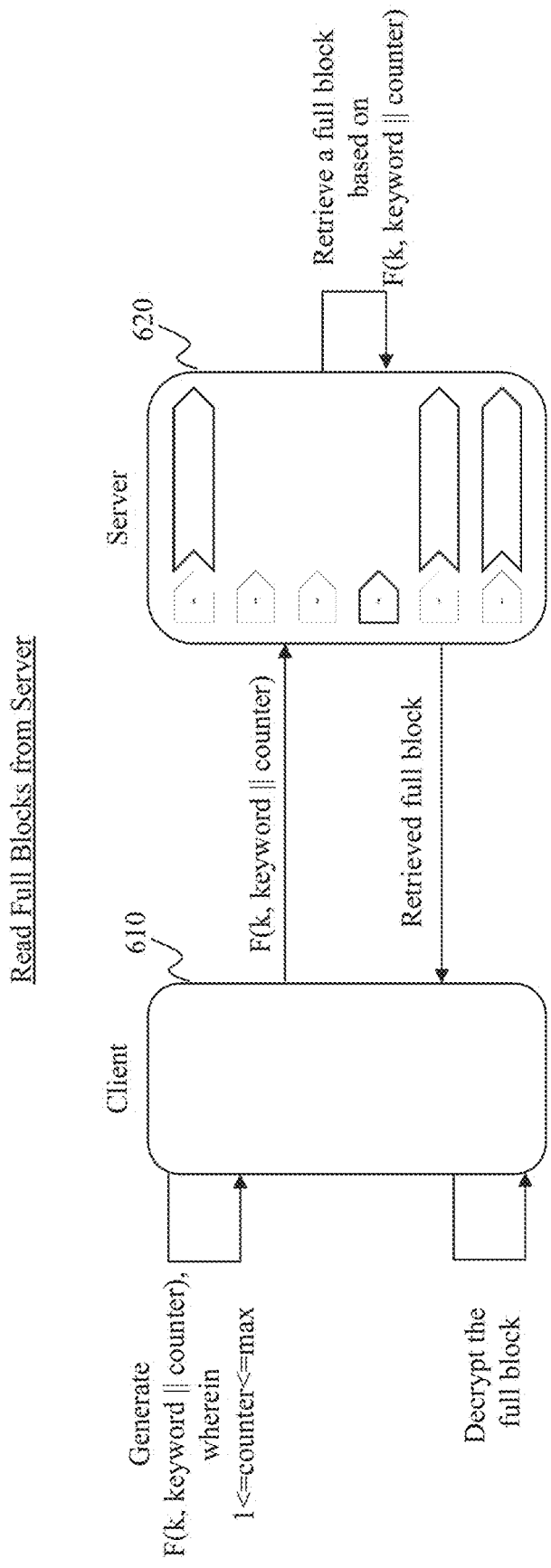
FIG. 6 illustrates a process for reading full blocks from a server, according to an embodiment of the present teaching.

FIG. 6 illustrates a process for reading full blocks from a server, according to an embodiment of the present teaching. As shown in FIG. 6, to read blocks associated with a keyword, the client 610 generates F(k, keyword||counter) for 1<=counter<=max, for a Pseudorandom function F, where k is a client secret key, and max is stored locally on the client 610. The client 610 sends the F(k, keyword||counter) to the server 620, which retrieves a full block based on F(k, keyword||counter). For example, the server 620 may just look up those locations indicated by F(k, keyword||counter) in its hash table and returns the full blocks to the client 610 client, which can decrypt the full blocks. The reading may be a part of a search for encrypted data.

Figure 7:
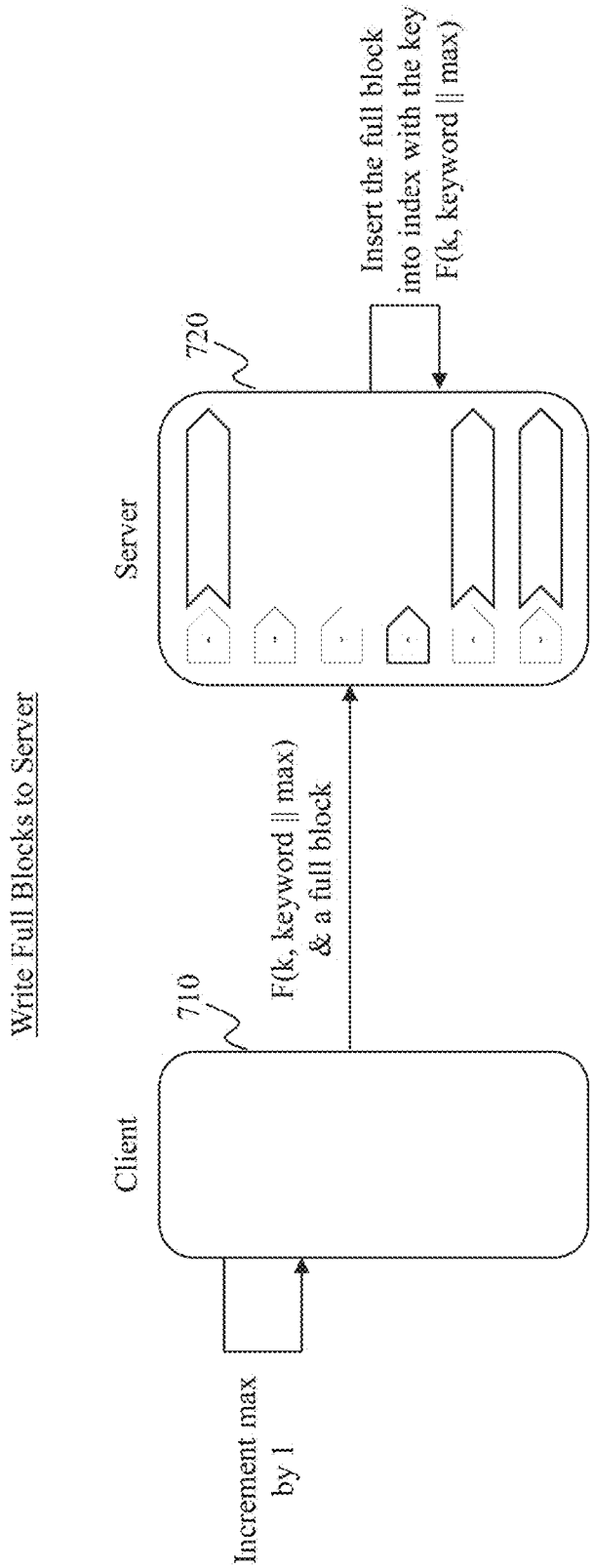
FIG. 7 illustrates a process for writing full blocks to a server, according to an embodiment of the present teaching.

FIG. 7 illustrates a process for writing full blocks to a server, according to an embodiment of the present teaching. As shown in FIG. 7, to write a full block to the server 720, the client 710 increments the max by 1 for that keyword locally and sends F(k, keyword||max) and the full block to the server 720, who may insert the full block into the hash table using F(k, keyword||max) as a location key.

Figure 8:
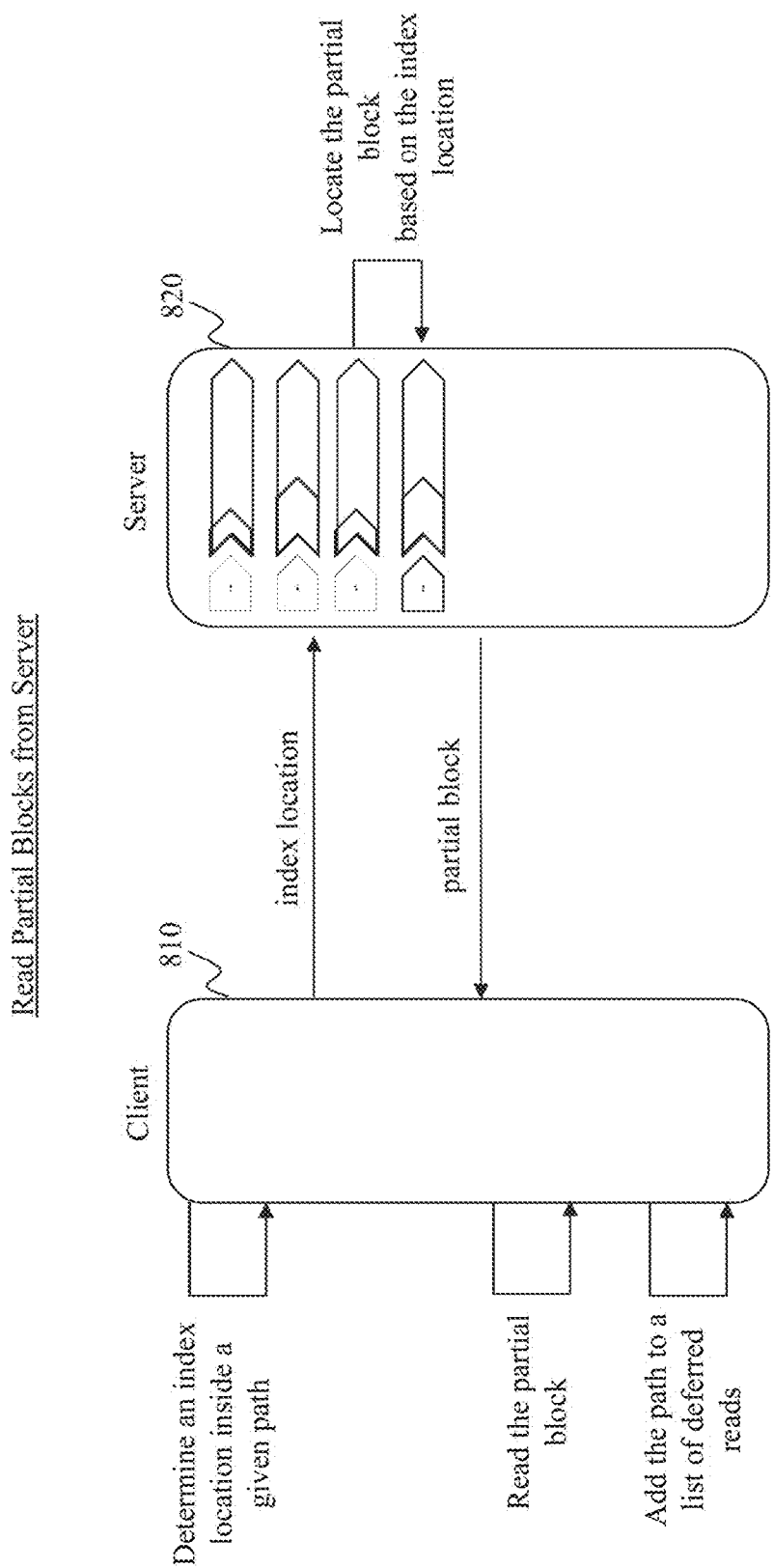
FIG. 8 illustrates a process for reading partial blocks from a server, according to an embodiment of the present teaching.

FIG. 8 illustrates a process for reading partial blocks from a server, according to an embodiment of the present teaching. As shown in FIG. 8, to read a partial block from the server 820, the client 810 first determines an index location inside a given path corresponding to the partial block, and then sends the index location to the server 820, who can directly locate the partial block based on the index location. The server 820 may then send the partial block to the client 810 for reading, e.g. reading a document ID in the partial block. The client 810 then adds the path to a list of paths associated with deferred reads, i.e. a list of paths to be shuffled later. As discussed above, the shuffles included in ORAM reads are deferred to the beginning of an update, i.e. when a new email is sent or received, and a partial block needs to be updated with a new email ID.

Figure 9:
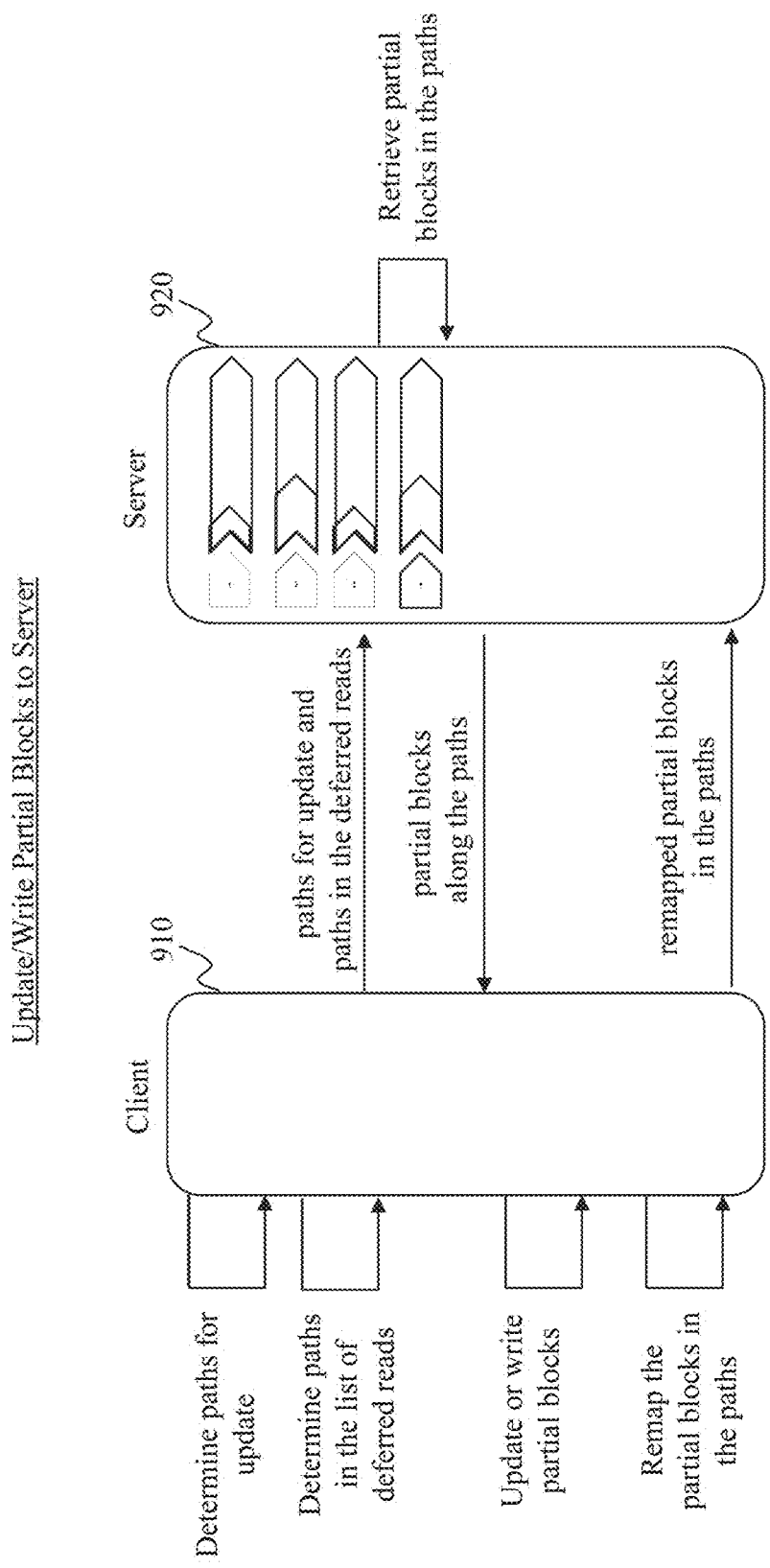
FIG. 9 illustrates a process for writing partial blocks to a server, according to an embodiment of the present teaching.

FIG. 9 illustrates a process for writing partial blocks to a server, according to an embodiment of the present teaching. As shown in FIG. 9, to write a partial block to the server 920, the client 910 determines paths for update, e.g. paths including partial blocks to be updated with a new email ID of a newly received or sent email. The client 910 also determines paths of the deferred reads, i.e. the paths related to previous reads and not yet shuffled. The client 910 can send both types of paths to the server 920 for retrieving partial blocks in these paths. The client 910 may then update or write some partial blocks, e.g. with a new email ID. The client 910 can remap the partial blocks in both types of paths, e.g. by shuffling the locations of the partial blocks in each of these paths, and send the remapped partial blocks back to the server 920. In this way, the client 910 can avoid leaking to the server 920 that which old block is associated with which email, when updating, and realize considerable savings in terms of IO efficiency.

Figure 10:
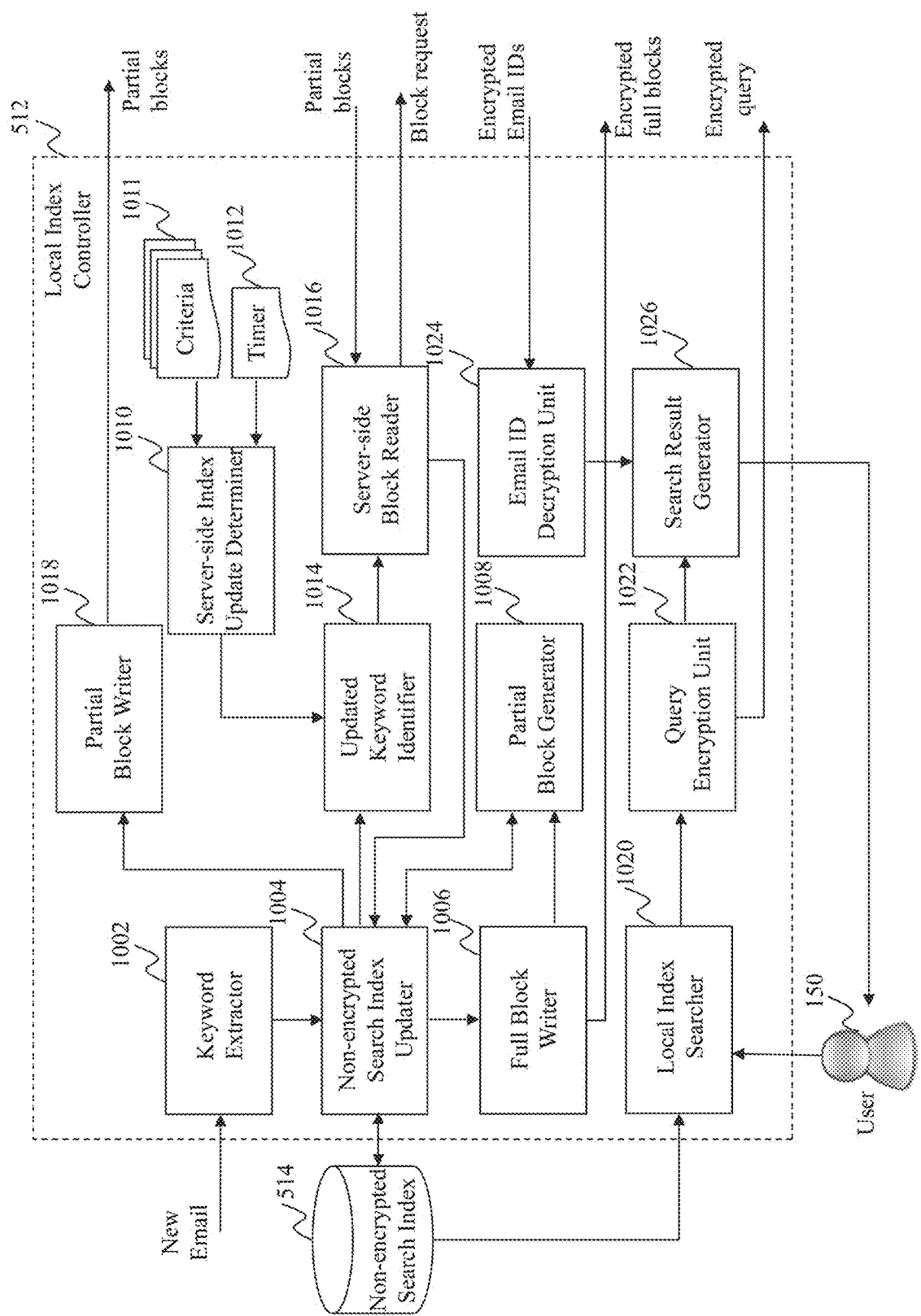
FIG. 10 illustrates an exemplary diagram of a local index controller on a client device, according to an embodiment of the present teaching.

FIG. 10 illustrates an exemplary diagram of a local index controller 512 on a client device, according to an embodiment of the present teaching. The local index controller 512 in this example includes a keyword extractor 1002, a non-encrypted search index updater 1004, a full block writer 1006, a partial block generator 1008, a server-side index update determiner 1010, update criteria 1011, a timer 1012, an updated keyword identifier 1014, a server-side block reader 1016, a partial block writer 1018, a local index searcher 1020, a query encryption unit 1022, an email ID decryption unit 1024, and a search result generator 1026.

The keyword extractor 1002 in this example may receive a new email for updating a search index. This new email may be a newly received email from another user to the user 150, or a newly sent email to another user from the user 150. As this email may include many keywords, the keyword extractor 1002 can extract these keywords for updating a search index. The keyword extractor 1002 may send the extracted keywords to the non-encrypted search index updater 1004.

The non-encrypted search index updater 1004 in this example may receive the keywords from the keyword extractor 1002 and generate (if not available) or update a local search index, e.g. the local index 514 for each of the keywords. The local search index may be a non-encrypted search index that includes partial blocks for different keywords. When one of the partial blocks becomes full after the updating with a keyword, the non-encrypted search index updater 1004 may send the block to the full block writer 1006 for writing the full block to the server and inform the partial block generator 1008 to generate a new partial block for the keyword.

The full block writer 1006 in this example may write a full block to the server, e.g. following a process shown in FIG. 7. The full block writer 1006 may determine a location in the full block index at the server, encrypt and write the full block to the location in the full block index at the server.

The partial block generator 1008 in this example may generate a new partial block for a keyword. In general, each keyword may have a corresponding partial block in the local stash of the client. After the corresponding partial block becomes full, it is pushed to the server and a new partial bock is needed.

After updating the local non-encrypted search index, the non-encrypted search index updater 1004 may send information about the updating to the updated keyword identifier 1014, which can identify keywords whose local index was updated in last period. The identified keywords can be used for updating partial blocks at the server. As discussed above, to save space and improve IO efficiency, instead of creating a new partial block for a keyword when the keyword comes again, the client can update the partial block at the server without leaking information.

The server-side index update determiner 1010 in this example may determine when to update a server-side index, e.g. the partial block index. The server-side index update determiner 1010 can determine the update based on criteria 1011 and a timer 1012. In one example, the server-side index update determiner 1010 may determine to update the server-side index periodically based on the timer 1012. In another example, the server-side index update determiner 1010 may determine to update the server-side index after a predetermined number of updates are accumulated, e.g. after 100 updates to various entries locally at the non-encrypted search index.

After the server-side index update determiner 1010 determines to update the server-side index, the updated keyword identifier 1014 may send the identified keywords to the server-side block reader 1016, which in this example may read partial blocks of these keywords from the server, e.g. as shown in FIG. 8. According to one embodiment, the non-encrypted search index updater 1004 may merge the obtained partial blocks with local partial blocks of the keywords. Again, if a full block is generated after the merging, the full block is encrypted and written to the server by the full block writer 1006, and the partial block generator 1008 will generate another partial block for the keyword. In this case, the partial block may be both stored locally and pushed to the server by the partial block writer 1018.

The partial block writer 1018 in this example may write a partial block to the server, e.g. as shown in FIG. 9. In particular, the partial block writer 1018 may fill each partial block with dummy encrypted document IDs and encrypt and write the padded partial blocks to a location in partial block index at the server.

The local index searcher 1020 in this example may receive a search request for encrypted emails of the user 150. The search request may include a query submitted by the user 150. The local index searcher 1020 can search the local index 514 on the client device based on the query to generate a list of email IDs.

The query encryption unit 1022 in this example may encrypt the query and send the encrypted query to the email server. In accordance with one embodiment, the email ID decryption unit 1024 in this example may obtain encrypted email IDs from the server, decrypt them and send them to the search result generator 1026.

In accordance with another embodiment, the query encryption unit 1022 may also send the encrypted query to the server-side block reader 1016 that can read from the server both full blocks according to a process in FIG. 6 and partial blocks according to a process in FIG. 8, based on the encrypted query, to search for encrypted email IDs corresponding to the query. In this case, the email ID decryption unit 1024 may obtain the encrypted email IDs from the server-side block reader 1016, decrypt them and send them to the search result generator 1026.

The search result generator 1026 in this example may generate a search result that includes email IDs obtained from the local index searcher 1020 and the email ID decryption unit 1024, and send the search result to the user 150 as a response to the search request.

Figure 11:
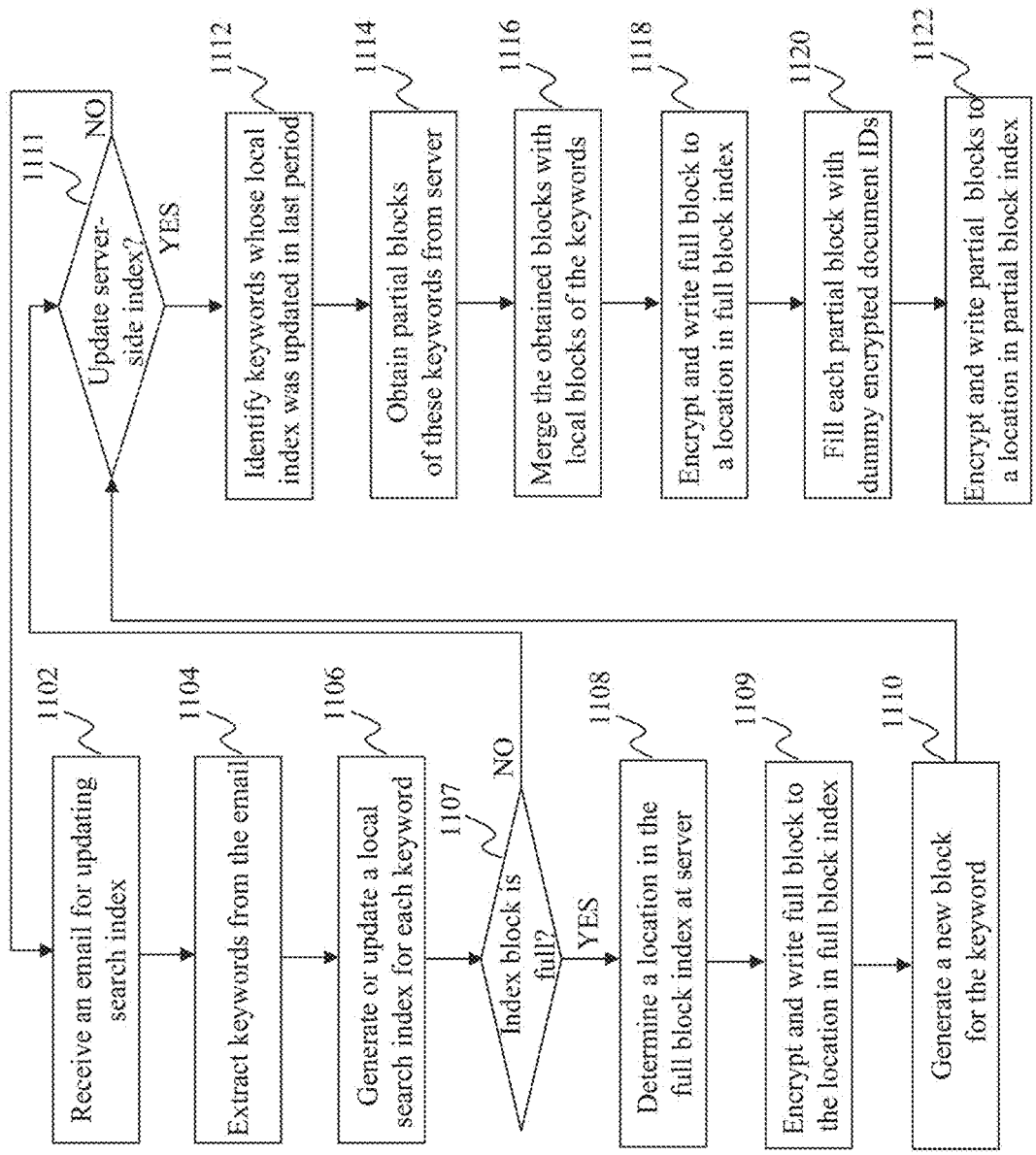
FIG. 11 is a flowchart of an exemplary process performed by a local index controller on a client device, according to an embodiment of the present teaching.

FIG. 11 is a flowchart of an exemplary process performed by a local index controller on a client device, e.g. the local index controller 512 in FIG. 10, according to an embodiment of the present teaching. This is an exemplary process for updating a search index. At 1102, an email is received for updating one or more search indices. This email may be a newly received or sent email. Keywords are extracted at 1104 from the email. A local search index is generated or updated at 1106 for each of the keywords. At 1107, it is determined whether a block in the local index is full. If so, the process goes to 1108 for determining a location in the full block index at the server, and encrypting and writing at 1109 the full block associated with a keyword to the location in the full block index. It can be understood that in some embodiments, the full block may not be pushed to the server right away.

At 1110, a new block is generated locally for the keyword. If not, the process goes to 1111 for determining whether to update server-side index, e.g. full block index and partial block index at the server. If not, the process may go back to 1102. If it is determined to update server-side index, the process goes to 1112 for identifying keywords whose local index was updated in last period. Partial blocks are obtained at 1114 for these keywords from the server. The obtained blocks are merged at 1116 with local blocks of corresponding keywords. At 1118, full blocks generated from the merging may be encrypted and written to a location in the full block index at the server. Each partial block is filled or padded at 1120 with dummy encrypted document IDs, e.g. email IDs. At 1122, the partial blocks are encrypted and written to a location in the partial block index at the server. As discussed above, the writing of the partial block may include shuffling the partial blocks in the same path of the partial block and shuffling blocks in other paths that were in a list of deferred reads.

It can be understood that the order of the steps shown in FIG. 11 may be changed according to different embodiments of the present teaching.

Figure 12:
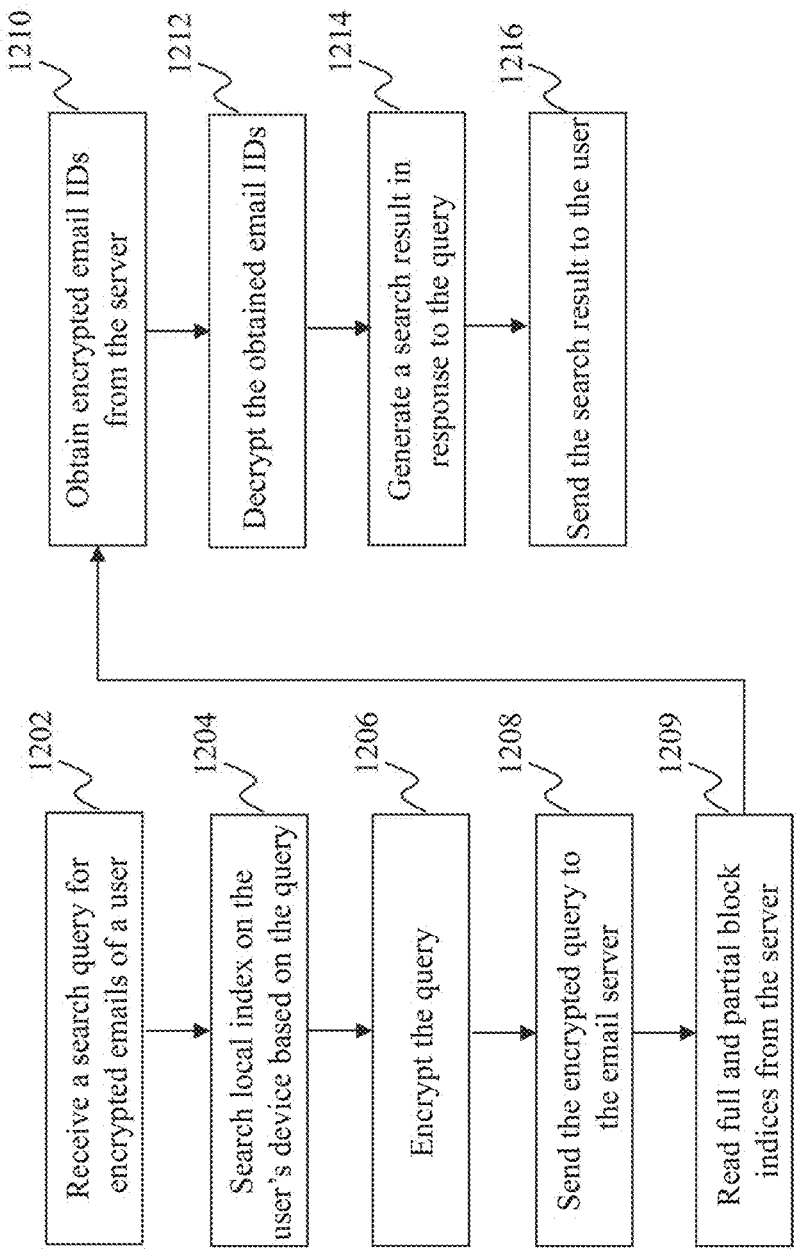
FIG. 12 is a flowchart of another exemplary process performed by a local index controller on a client device, according to an embodiment of the present teaching.

FIG. 12 is a flowchart of another exemplary process performed by a local index controller on a client device, e.g. the local index controller 512 in FIG. 10, according to an embodiment of the present teaching. This is an exemplary process for searching encrypted emails with a query. At 1202, a search request, including a search query, may be received for encrypted emails of a user. A local index on the user's device is searched at 1204 based on the query. The query is encrypted at 1206 and sent at 1208 to the email server. Both full block index and partial block index at the server may be read at 1209, based on the encrypted query. At 1210, encrypted email IDs are obtained from the server or by reading the indices at the server. At 1212, the obtained email IDs are decrypted. A search result is generated at 1214 in response to the query. The search result is sent to the user at 1216.

It can be understood that the order of the steps shown in FIG. 12 may be changed according to different embodiments of the present teaching.

Figure 13:
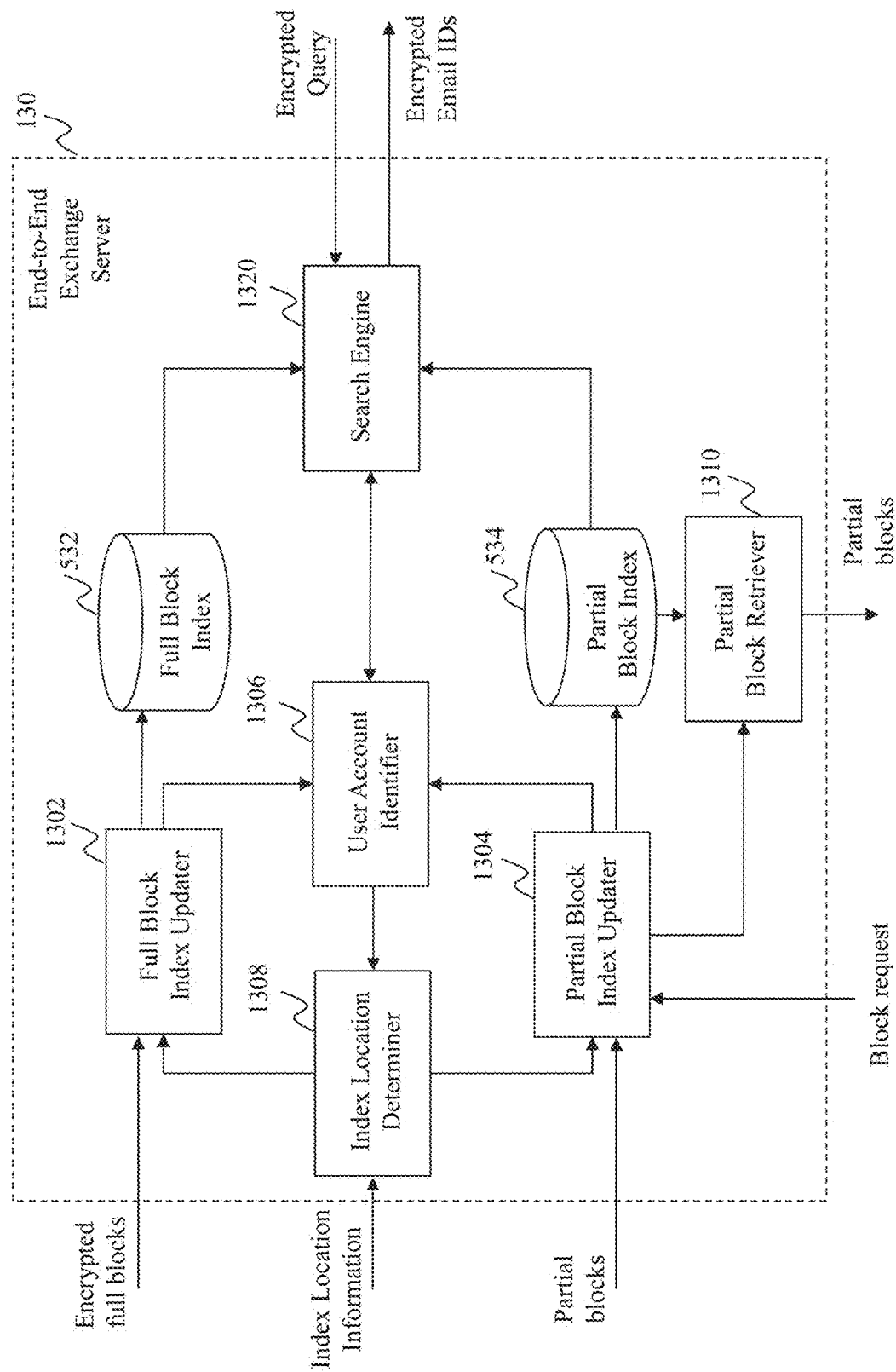
FIG. 13 illustrates an exemplary diagram of an end-to-end exchange server, according to an embodiment of the present teaching.

FIG. 13 illustrates an exemplary diagram of an end-to-end exchange server 130, according to an embodiment of the present teaching. As shown in FIG. 13, the end-to-end exchange server 130 in this example includes a full block index updater 1302, a partial block index updater 1304, a user account identifier 1306, an index location determiner 1308, a partial block retriever 1310, a full block index 532, a partial block index 534, and a search engine 1320.

The full block index updater 1302 in this example may receive encrypted full blocks from a user's device for updating the full block index 532. The full block index updater 1302 may inform the user account identifier 1306 to identify a user account of the user and obtain an index location from the index location determiner 1308 for updating the full block index 532. As the full block index 532 can include full block indices of different users, the full block index updater 1302 can determine the full block index associated with the user, based on the user account. In one example, the full block index updater 1302 may insert an encrypted full block to the full block index associated with the user at the index location.

The user account identifier 1306 in this example may identify the user's account and send the user account information to the index location determiner 1308 for determining an index location and to the search engine 1320 for retrieving or searching corresponding blocks.

The index location determiner 1308 in this example may determine an index location of a block, e.g. a location of a full block in the full block index 532 or a location of a partial block in the partial block index 534. The index location determiner 1308 may determine the index location based on index location information received from the user's device, e.g. as shown in the reading processes in FIG. 6 and FIG. 8. The index location determiner 1308 may send the index location to the full block index updater 1302 for updating the full block index 532 or to the partial block index updater 1304 for updating the partial block index 534.

The partial block index updater 1304 in this example may receive encrypted partial blocks from a user's device for updating the partial block index 534. The partial block index updater 1304 may inform the user account identifier 1306 to identify a user account of the user and obtain an index location from the index location determiner 1308 for updating the partial block index 534. As the partial block index 534 can include partial block indices of different users, the partial block index updater 1304 can determine the partial block index associated with the user, based on the user account. In one example, the partial block index updater 1304 may insert an encrypted partial block to the partial block index associated with the user at the index location. As discussed above, the encrypted partial block may have been shuffled in a path such that a same partial block may be located at different locations in the partial block index 534 at different times. Then, the end-to-end exchange server 130 cannot know which old partial block is associated with which email, during searching.

The partial block index updater 1304 in this example may also receive a block request from a user's device for retrieving a partial block. Based on the user account determined by the user account identifier 1306 and the index location determined by the index location determiner 1308, the partial block retriever 1310 may retrieve the partial block from the index location in the partial block index 534, and send the partial block to the user's device.

The search engine 1320 in this example may receive an encrypted query from a user's device, and inform the user account identifier 1306 to identify the user's account. Based on the user account, the search engine 1320 can determine the full block index and the partial block index of the user. In one embodiment, the search engine 1320 searches against the full block index and the partial block index, based on the encrypted query, to determine one or more encrypted email IDs. In another embodiment, the search engine 1320 may just learn which locations to look up in the full block index 532 and the partial block index 534 to get the one or more encrypted email IDs, via the read operations shown in FIG. 6 and FIG. 8, where the locations are determined by the client based on the encrypted query. The search engine 1320 may send the one or more encrypted email IDs to the client device for generating a search result.

Figure 14:
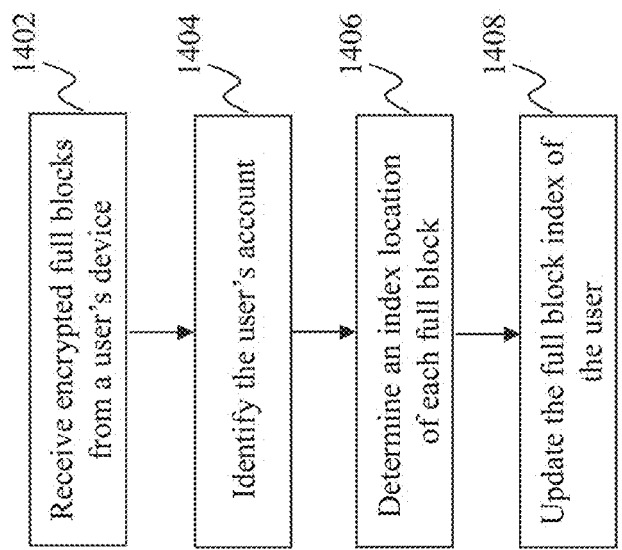
FIG. 14 is a flowchart of an exemplary process for updating full block index on an end-to-end exchange server, according to an embodiment of the present teaching.

FIG. 14 is a flowchart of an exemplary process for updating full block index on an end-to-end exchange server, e.g. the end-to-end exchange server 130 in FIG. 13, according to an embodiment of the present teaching. Encrypted full blocks are received at 1402 from a user's device. The user's account is identified at 1404. An index location is determined at 1406 for each full block, e.g. based on location information from the user's device. At 1408, the full block index of the user is updated with the encrypted full block.

Figure 15:
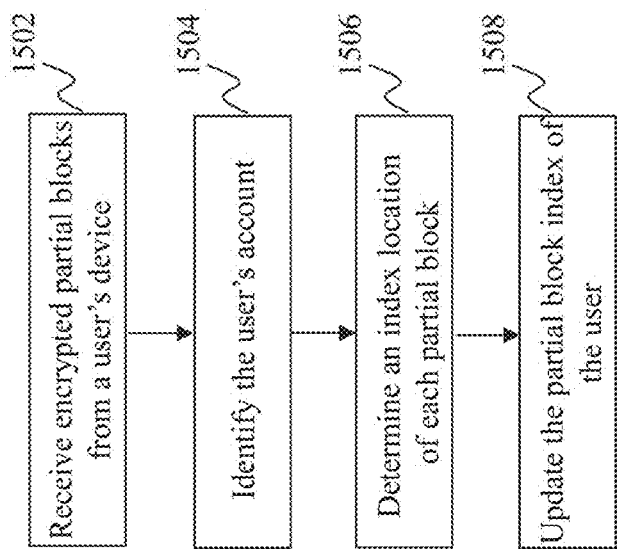
FIG. 15 is a flowchart of an exemplary process for updating partial block index on an end-to-end exchange server, according to an embodiment of the present teaching.

FIG. 15 is a flowchart of an exemplary process for updating partial block index on an end-to-end exchange server, e.g. the end-to-end exchange server 130 in FIG. 13, according to an embodiment of the present teaching. Encrypted partial blocks are received at 1502 from a user's device. The user's account is identified at 1504. An index location is determined at 1506 for each partial block, e.g. based on location information from the user's device. At 1508, the partial block index of the user is updated with the encrypted partial block.

Figure 16:
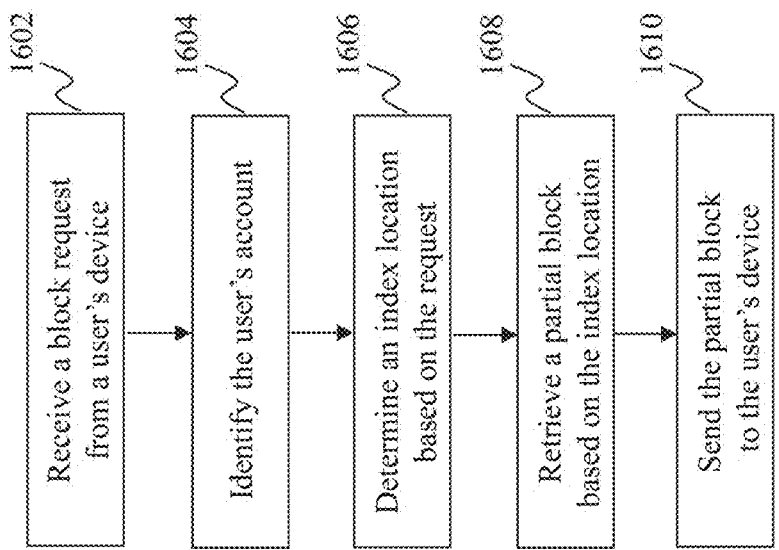
FIG. 16 is a flowchart of an exemplary process for sending a partial block to a client device to be filled up, according to an embodiment of the present teaching.

FIG. 16 is a flowchart of an exemplary process for retrieving a partial block at an end-to-end exchange server, e.g. the end-to-end exchange server 130 in FIG. 13, according to an embodiment of the present teaching. A block request is received at 1602 from a user's device. The user's account is identified at 1604. An index location is determined at 1606 based on the request. At 1608, a partial block is retrieved based on the index location. The partial block is sent at 1610 to the user's device.

Figure 17:
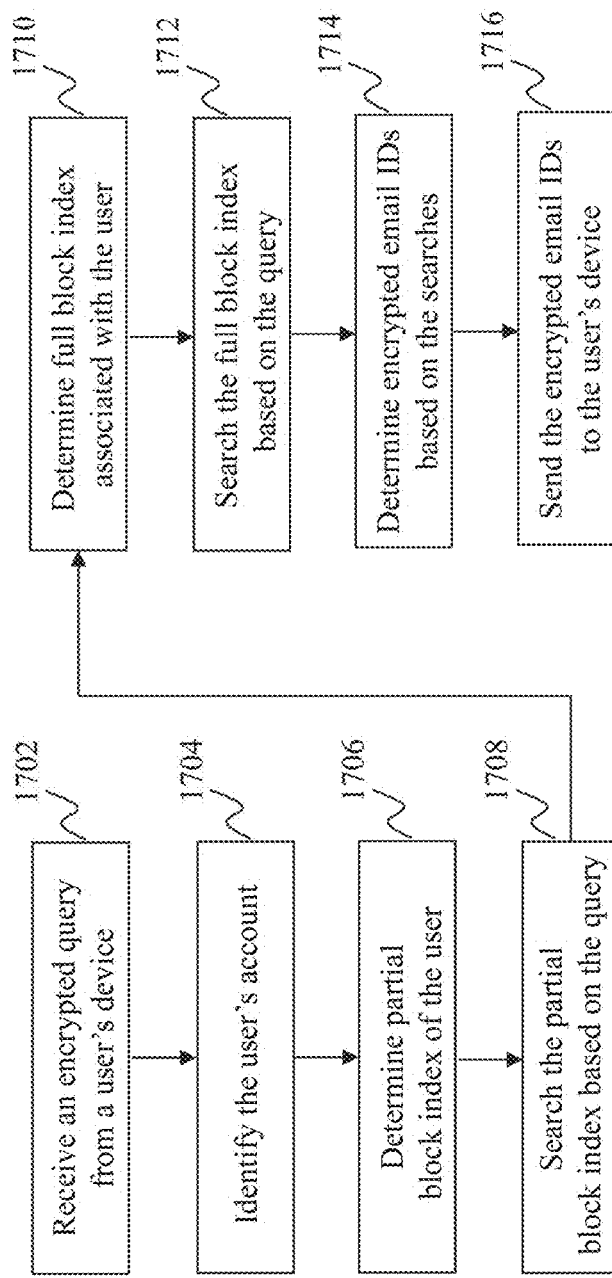
FIG. 17 is a flowchart of an exemplary process for searching encrypted emails on an end-to-end exchange server, according to an embodiment of the present teaching.

FIG. 17 is a flowchart of an exemplary process for searching encrypted emails on an end-to-end exchange server, e.g. the end-to-end exchange server 130 in FIG. 13, according to an embodiment of the present teaching. An encrypted query is received at 1702 from a user's device. The user's account is identified at 1704. At 1706, partial block index of the user is determined. The partial block index is searched based on the encrypted query at 1708. At 1710, full block index of the user is determined. The full block index is searched based on the encrypted query at 1712. One or more encrypted email IDs are determined at 1714 based on the searches. At 1716, the one or more encrypted email IDs are sent to the user's device.

It can be understood that the order of the steps shown in each of FIG. 14, FIG. 15, FIG. 16, and FIG. 17 may be changed according to different embodiments of the present teaching.

Figure 18:
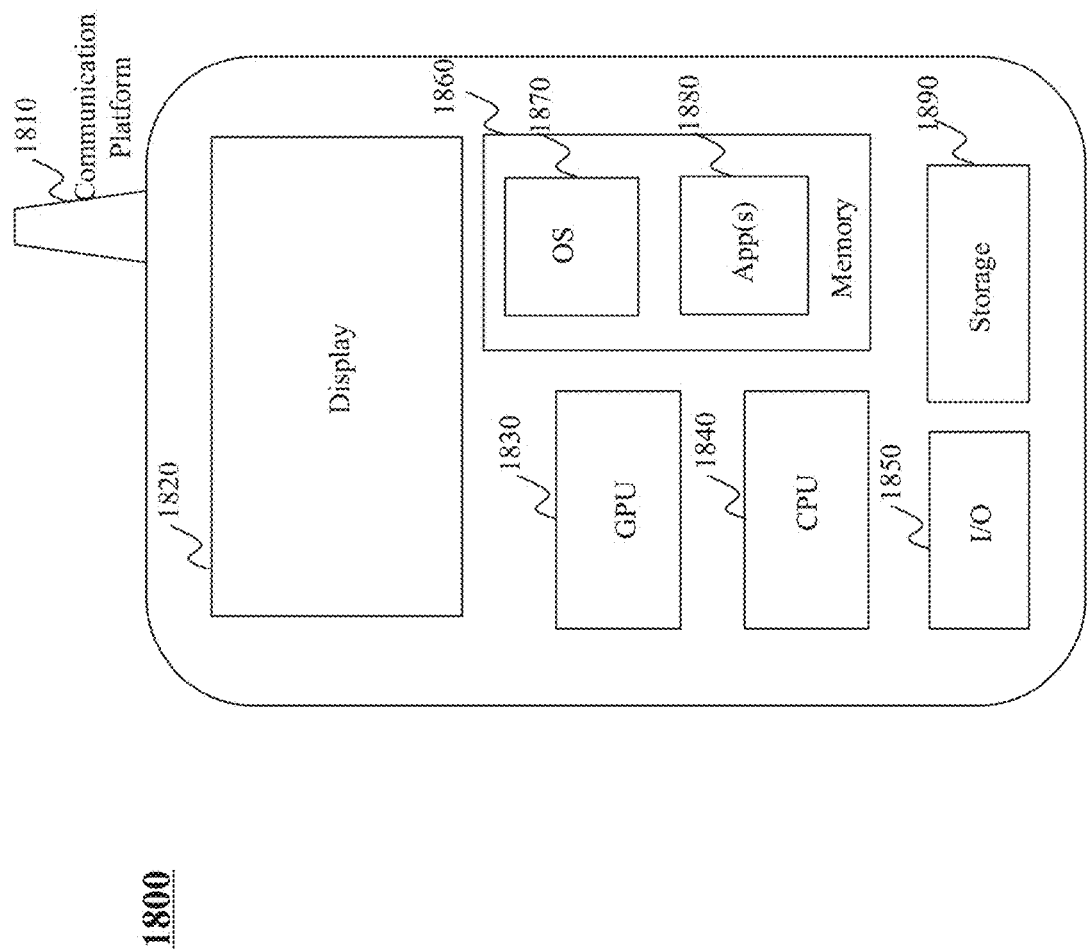
FIG. 18 depicts the architecture of a mobile device which can be used to implement a specialized system incorporating the present teaching.

FIG. 18 depicts the architecture of a mobile device which can be used to realize a specialized system implementing the present teaching. In this example, the client device or the server is a mobile device 1800, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1800 in this example includes one or more central processing units (CPUs) 1840, one or more graphic processing units (GPUs) 1830, a display 1820, a memory 1860, a communication platform 1810, such as a wireless communication module, storage 1890, and one or more input/output (I/O) devices 1850. Any other suitable component, including but not limited to a system bus or a controller (not shown), may also be included in the mobile device 1800. As shown in FIG. 18, a mobile operating system 1870, e.g., iOS, Android, Windows Phone, etc., and one or more applications 1880 may be loaded into the memory 1860 from the storage 1890 in order to be executed by the CPU 1840. The applications 1880 may include a browser or any other suitable mobile apps for end-to-end emails and searching the emails on the mobile device 1800 and the server. User interactions with the device 1800 may be achieved via the I/O devices 1850.

To implement various modules, units, and their functionalities described in the present disclosure, computer hardware platforms may be used as the hardware platform(s) for one or more of the elements described herein (e.g., the end-to-end exchange server 130, the client devices 110, and/or other components of the system 100 described with respect to FIGS. 1-17). The hardware elements, operating systems and programming languages of such computers are conventional in nature, and it is presumed that those skilled in the art are adequately familiar therewith to adapt those technologies to searching encrypted data as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 19:
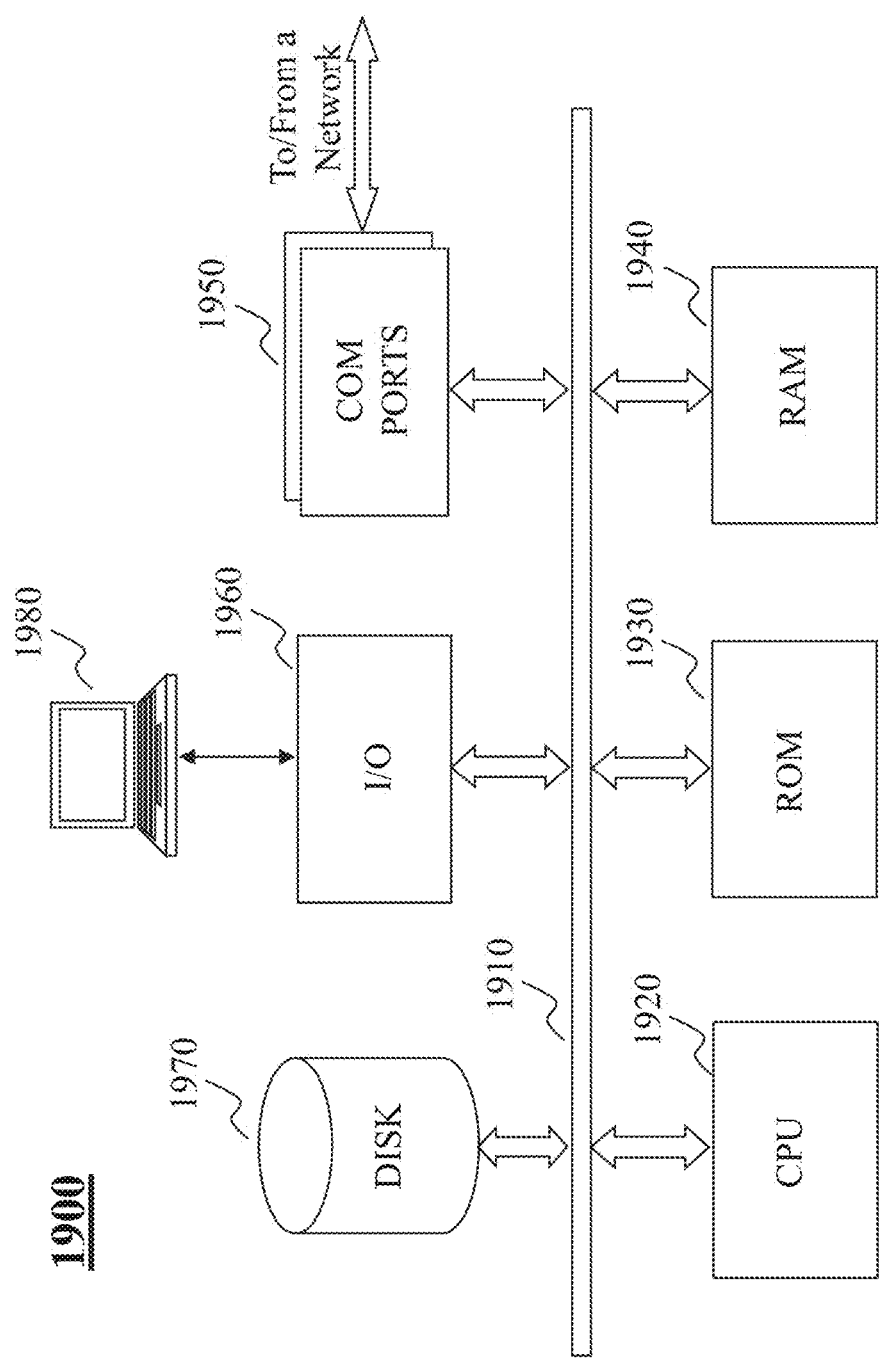
FIG. 19 depicts the architecture of a computer which can be used to implement a specialized system incorporating the present teaching.

FIG. 19 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1900 may be used to implement any component of the encrypted data searching techniques, as described herein. For example, the end-to-end exchange server 130, the client devices 110, etc., may be implemented on a computer such as computer 1900, via its hardware, software program, firmware, or a combination thereof. Although only one such computer is shown, for convenience, the computer functions relating to encrypted data searching as described herein may be implemented in a distributed fashion on a number of similar platforms, to distribute the processing load.

The computer 1900, for example, includes COM ports 1950 connected to and from a network connected thereto to facilitate data communications. The computer 1900 also includes a central processing unit (CPU) 1920, in the form of one or more processors, for executing program instructions. The exemplary computer platform includes an internal communication bus 1910, program storage and data storage of different forms, e.g., disk 1970, read only memory (ROM) 1930, or random access memory (RAM) 1940, for various data files to be processed and/or communicated by the computer, as well as possibly program instructions to be executed by the CPU. The computer 1900 also includes an I/O component 1960, supporting input/output flows between the computer and other components therein such as user interface elements 1980. The computer 1900 may also receive programming and data via network communications.

Hence, aspects of the methods of encrypted data searching, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with encrypted data searching techniques. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the encrypted data searching as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for updating an index, the method comprising:
receiving a document;
determining an encrypted keyword based on the document;
updating, based on the encrypted keyword, a partial block in a path of an encrypted index;
padding the partial block with one or more dummy document identifiers (IDs);
encrypting the partial block comprising the one or more dummy document IDs to generate an encrypted partial block; and
providing the encrypted partial block to a server to be inserted within the encrypted index based on the path.

2. The method of claim 1, wherein an index location inside the path of the encrypted index is determined and the partial block is read from the index location such that the encrypted partial block is inserted within the encrypted index based on the index location.

3. The method of claim 2, further comprising:
receiving the encrypted partial block from the server; and
adding the path to a list of paths associated with deferred reads.

4. The method of claim 3, further comprising:
determining that an event associated with an update to the encrypted partial block occurred;
re-mapping the encrypted partial block based on the list of paths associated with deferred reads in response to the event; and
providing the re-mapped encrypted partial block to the server.

5. The method of claim 3, wherein providing further comprises:
shuffling partial blocks in the path of the encrypted partial block to be written to the encrypted index; and
shuffling blocks in other paths included within the list of paths.

6. The method of claim 1, wherein the encrypted index is built based on an encrypted oblivious Random Access Memory (RAM).

7. The method of claim 1, wherein shuffling included by a read of the encrypted partial block is deferred to a beginning of an update.

8. A machine-readable tangible and non-transitory medium having information for updating an index, wherein the information, when read by the machine, causes the machine to:
receive a document;
determine an encrypted keyword based on the document;
update, based on the encrypted keyword, a partial block in a path of an encrypted index;
pad the partial block with one or more dummy document identifiers (IDs);
encrypt the partial block comprising the one or more dummy document IDs to generate an encrypted partial block; and
provide the encrypted partial block to a server to be inserted within the encrypted index based on the path.

9. The medium of claim 8, wherein an index location inside the path of the encrypted index is determined and the partial block is read from the index location such that the encrypted partial block is inserted within the encrypted index based on the index location.

10. The medium of claim 9, wherein the information, when read by the machine, further causes the machine to:
receive the encrypted partial block from the server; and
add the path to a list of paths associated with deferred reads.

11. The medium of claim 10, wherein the information, when read by the machine, further causes the machine to:
determine that an event associated with an update to the encrypted partial block occurred;
re-map the encrypted partial block based on the list of paths associated with deferred reads in response to the event; and
provide the re-mapped encrypted partial block to the server.

12. The medium of claim 10, wherein the information associated with encrypted partial block being provided to the server, when read by the machine, further causes the machine to:
shuffle partial blocks in the path of the encrypted partial block to be written to the encrypted index; and
shuffle blocks in other paths included within the list of paths.

13. The medium of claim 8, wherein the encrypted index is built based on an encrypted oblivious Random Access Memory (RAM).

14. The medium of claim 8, wherein shuffling included by a read of the encrypted partial block is deferred to a beginning of an update.

15. A system for updating an index, comprising:
a keyword extractor, implemented by one or more processors, configured to receive a document;
an updated keyword identifier, implemented by one or more processors, configured to determine an encrypted keyword based on the document and update, based on the encrypted keyword, a partial block in a path of an encrypted index; and
a partial block writer, implemented by one or more processors, configured to:
pad the partial block with one or more dummy document identifiers (IDs);
encrypt the partial block comprising the one or more dummy document IDs to generate an encrypted partial block; and
provide the encrypted partial block to a server to be inserted within the encrypted index based on the path.

16. The system of claim 15, wherein an index location inside the path of the encrypted index is determined and the partial block is read from the index location such that the encrypted partial block is inserted within the encrypted index based on the index location.

17. The system of claim 16, further comprising:
a server-side block reader, implemented by one or more processors, configured to:
receive the encrypted partial block from the server; and
add the path to a list of paths associated with deferred reads.

18. The system of claim 17, wherein:
an event associated with an update to the encrypted partial block occurred is determined;

the encrypted partial block based on the list of paths associated with deferred reads in response to the event is re-mapped; and the re-mapped encrypted partial block is provided to the server.

19. The system of claim 17, wherein:

partial blocks in the path of the encrypted partial block to be written to the encrypted index are shuffled; and blocks in other paths included within the list of paths are shuffled.

20. The system of claim 15, wherein:

the encrypted index is built based on an encrypted oblivious Random Access Memory (RAM); and shuffling included by a read of the encrypted partial block is deferred to a beginning of an update.

* * * * *